US008814704B2

(12) United States Patent
Togashi

(10) Patent No.: US 8,814,704 B2
(45) Date of Patent: Aug. 26, 2014

(54) GAME SERVER THAT ALLOWS ONLINE GAME USER TO DESIGNATE PROXY TO EXERCISE AN AREA LIMITED ACQUISITION RIGHT, GAME CONTROLLING METHOD THEREOF, GAME SYSTEM, AND NON-TRANSITORY COMPUTER-READABLE MEDIUM

(71) Applicant: gloops, Inc., Tokyo (JP)

(72) Inventor: Hidemasa Togashi, Tokyo (JP)

(73) Assignee: gloops, Inc., Tokyo (JP)

( * ) Notice: Subject to any disclaimer, the term of this patent is extended or adjusted under 35 U.S.C. 154(b) by 0 days.

(21) Appl. No.: 14/037,152

(22) Filed: Sep. 25, 2013

(65) Prior Publication Data

US 2014/0087864 A1    Mar. 27, 2014

(30) Foreign Application Priority Data

Sep. 25, 2012 (JP) ................................. 2012-211479

(51) Int. Cl.
*A63F 9/24* (2006.01)
*A63F 13/12* (2006.01)

(52) U.S. Cl.
CPC ..................................... *A63F 13/12* (2013.01)
USPC .......................................................... 463/42

(58) Field of Classification Search
CPC ......... A63F 13/00; A63F 13/10; A63F 13/12; A63F 2300/5533; A63F 2300/556; A63F 2300/5573; A63F 2300/5586; A63F 2300/609; A63F 2300/69; A63F 2300/8052; A63F 2300/8058
USPC .......................................................... 463/42
See application file for complete search history.

(56) References Cited

U.S. PATENT DOCUMENTS

2002/0090985 A1*   7/2002   Tochner et al. .................... 463/1
2008/0096661 A1*   4/2008   Ikeda et al. ...................... 463/40

(Continued)

FOREIGN PATENT DOCUMENTS

| JP | 2002/281566 | 9/2002 |
| JP | 2008/194314 | 8/2008 |
| JP | 2012/024248 | 2/2012 |
| JP | 2012/024416 | 2/2012 |

OTHER PUBLICATIONS

"56 Q&A for Dragon Collection!", Application STYLE, Eastpress, Jul. 1, 2011, 3, 7 pages.

(Continued)

*Primary Examiner* — Lawrence Galka
(74) *Attorney, Agent, or Firm* — Baker & Hostetler LLP

(57) ABSTRACT

A game server includes an acquisition right-granting section that grants an acquisition right for acquiring an item in a virtual space to a first virtual user, a proxy right-generating section that generates a proxy right to allow a second virtual user to exercise the acquisition right as a proxy, a proxy right-granting section that grants only the proxy right to the second virtual user, a positional information acquisition section that acquires a position of a second physical user's terminal, a proxy right-exercising section that exercises the proxy right by the second virtual user, an area-limited item-storing section that stores an area-limited item in association with a position in the physical space, an item information reading/loading section that reads/loads an area-limited item from the area-limited item storing section, and an item-providing section that provides only the first virtual user with the area-limited item read/loaded by the item information reading/loading section.

6 Claims, 22 Drawing Sheets

(56) References Cited

U.S. PATENT DOCUMENTS

| | | | |
|---|---|---|---|
| 2010/0125622 A1* | 5/2010 | White et al. | 709/201 |
| 2011/0039622 A1* | 2/2011 | Levenson | 463/42 |
| 2011/0070935 A1* | 3/2011 | Beggs | 463/1 |
| 2013/0137515 A1* | 5/2013 | Kusuda et al. | 463/31 |

OTHER PUBLICATIONS

"COLOPL Releases the Card Battle Game: Genesis of Aquarion—Ultimate Battle—Aquarion is Reborn as a Location-Based Game After 12000 Years", http://colopl.co.jp/news/pressrelease/2011110801.php, News Release of COLOPL, Inc., COLOPL, Inc., Nov. 8, 2011, 2 pages.

"Idol Master Mobile-i, Idol Master Mobile J Upgraded!", http://game.watch.impress.co.jp/docs/news/20120315_519093.htrnl, Namco Bandai Games, Inc., iOS Game Watach, Impress Watch Corporation, Mar. 15, 2013, 6 pages.

"The Mobile Site of the Star Master Mobile of the Star Master Series Will Be Relaunched on Dec. 20, Tour Around the Nation to Help Stars to Rise to the Status of National Stars", http://www.4gamr.net/games/115/G011531/20101210003/, 4Gamer.net, Aetas, Inc., Dec. 10, 2010, 5 pages.

Japanese Patent Application No. 2012-211479: Decision to Grant a Patent dated Mar. 9, 2013, 5 pages.

Japanese Patent Application No. 2012-211479: Office Action dated Oct. 25, 2012, 9 pages.

Japanese Patent Application No. 2012-211479: Office Action dated Jan. 21, 2013, 16 pages.

Japanese Patent Application No. 2013-048313: Office Action dated Nov. 25, 2013, 15 pages.

* cited by examiner

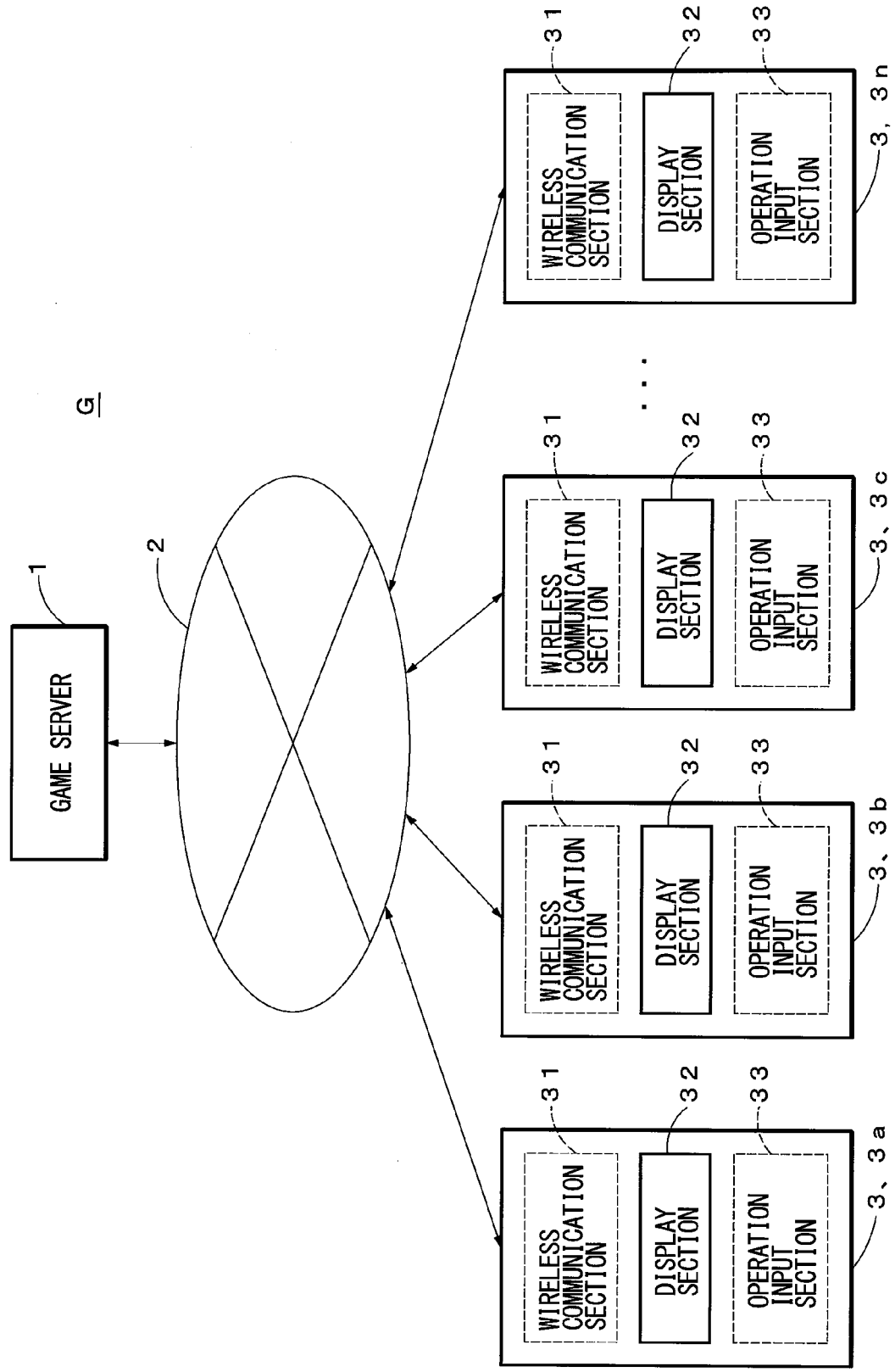
F I G. 1

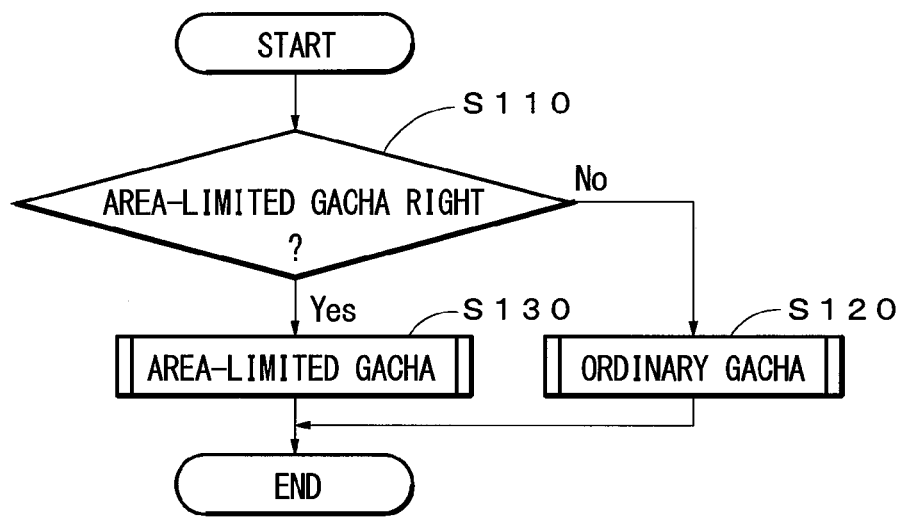
F I G. 7
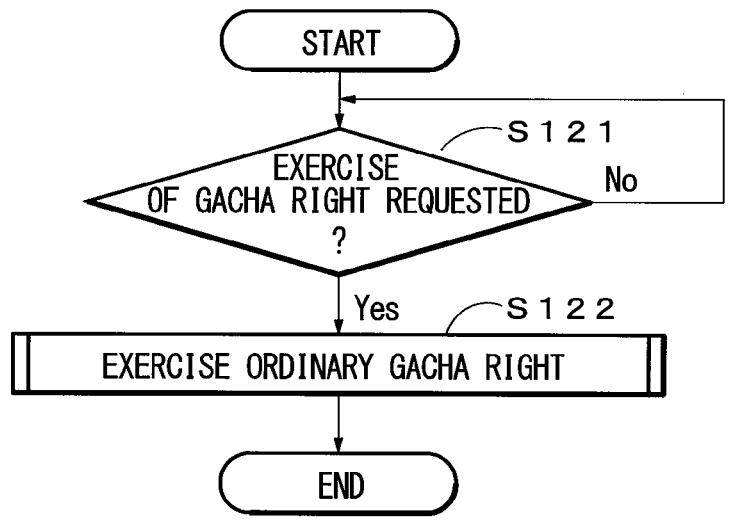
F I G. 8
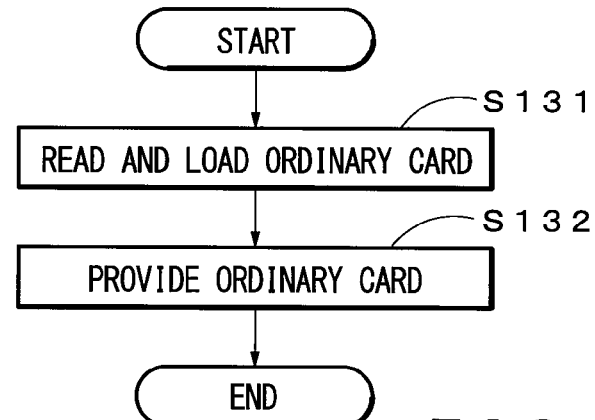
F I G. 9

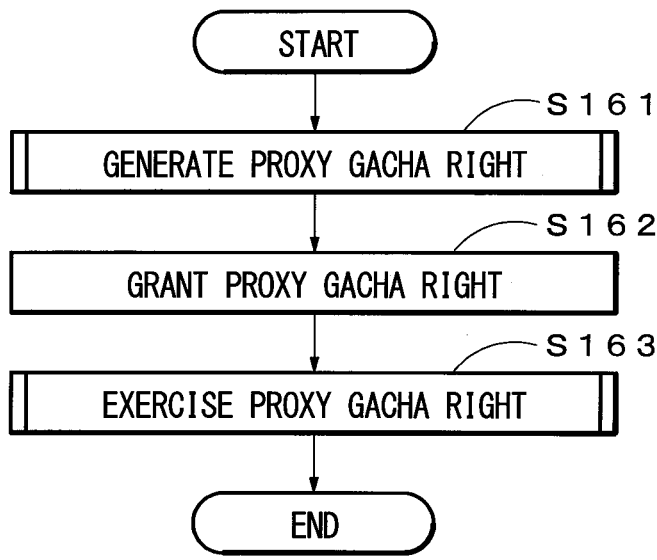
F I G. 1 2
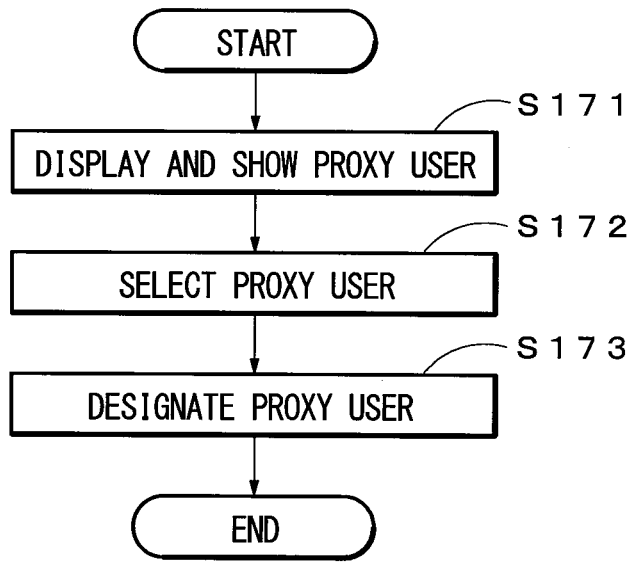
F I G. 1 3

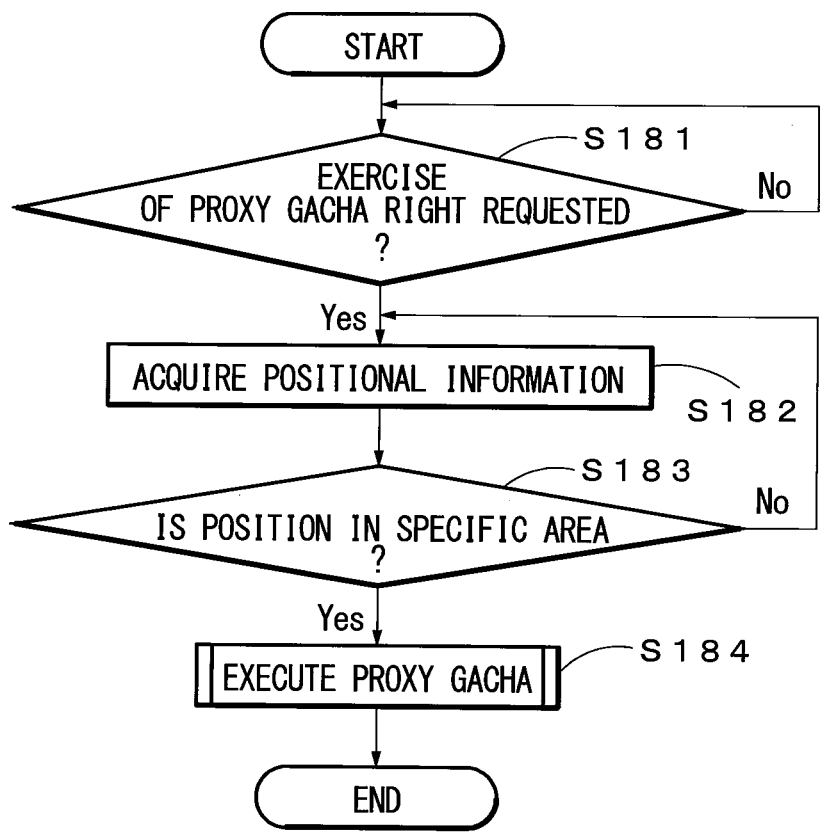
F I G. 14
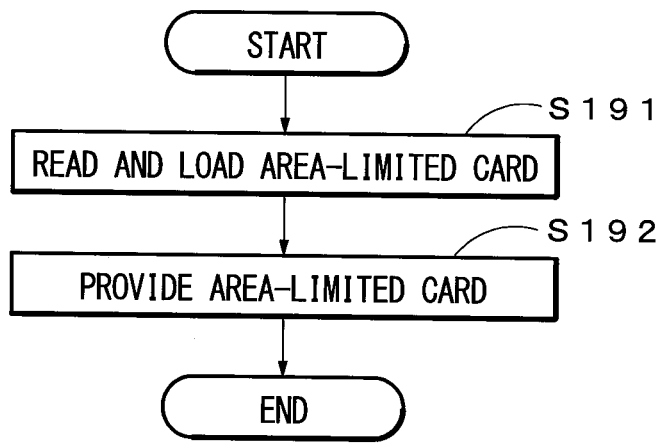
F I G. 15

| IMAGE DATA | CARD IDENTIFICATION INFORMATION (ID, FileName, URI) |

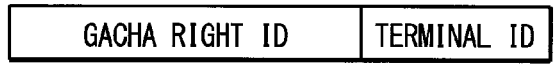
F I G. 1 9 A
F I G. 1 9 B
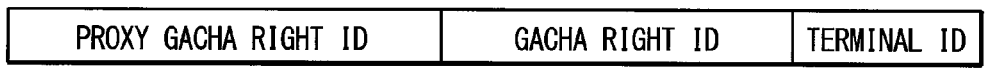
F I G. 1 9 C
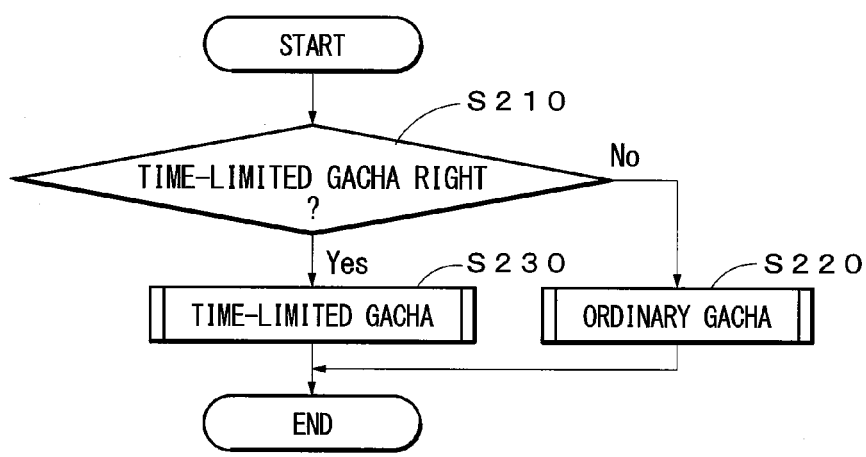
F I G. 2 4

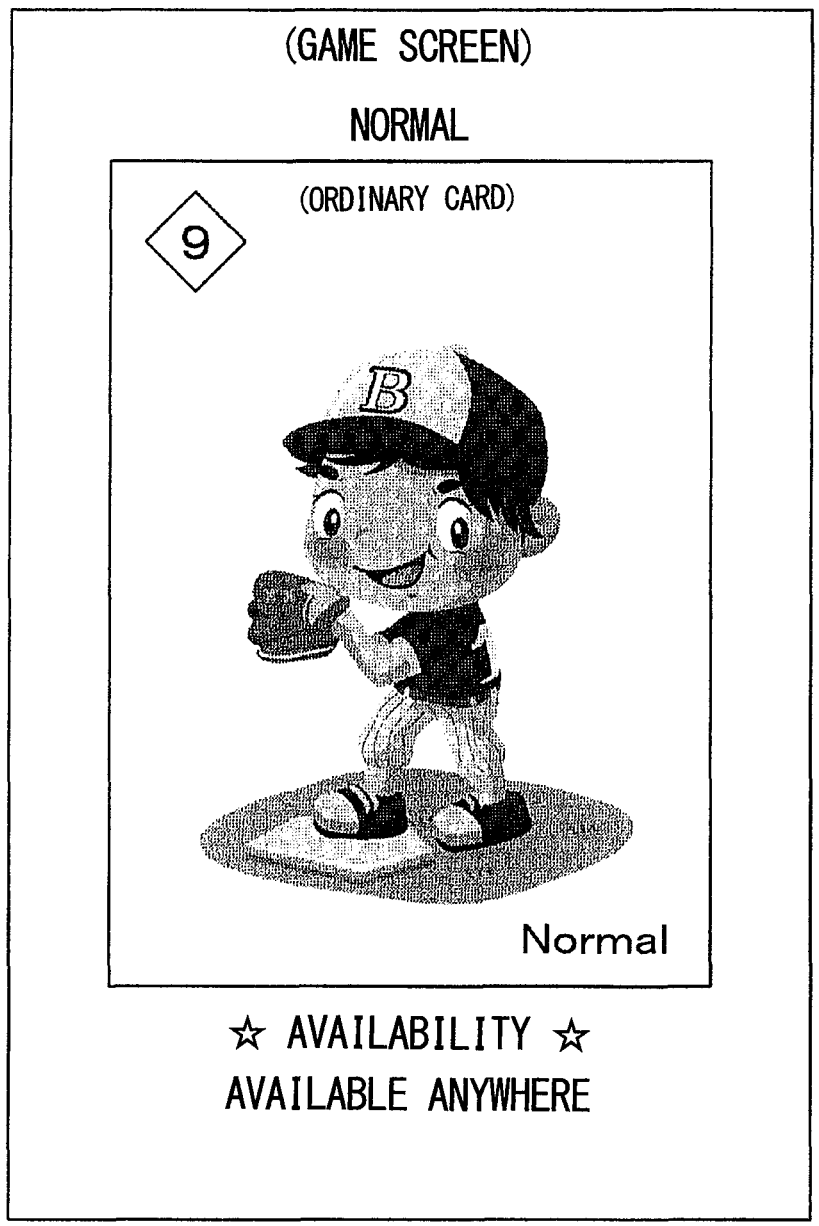
F I G. 2 1

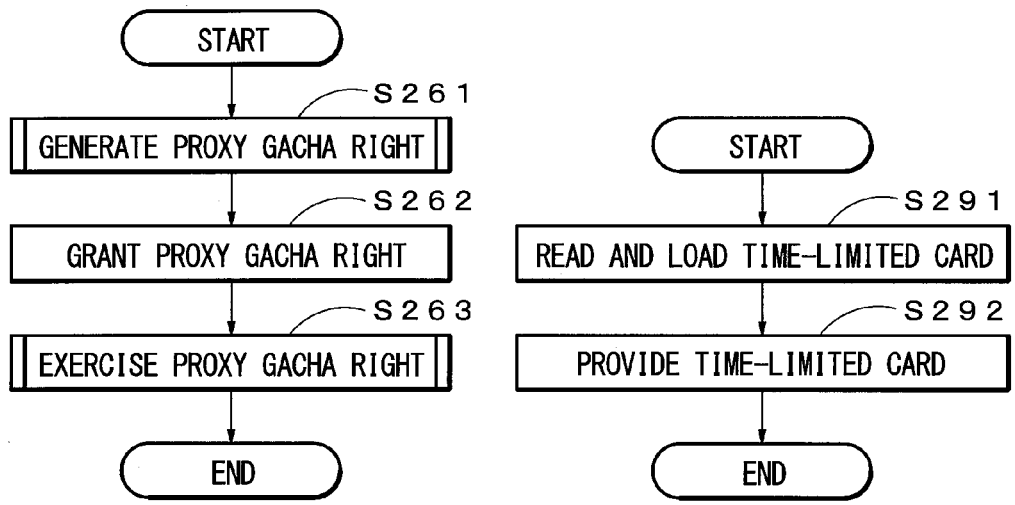
F I G. 2 7     F I G. 2 9
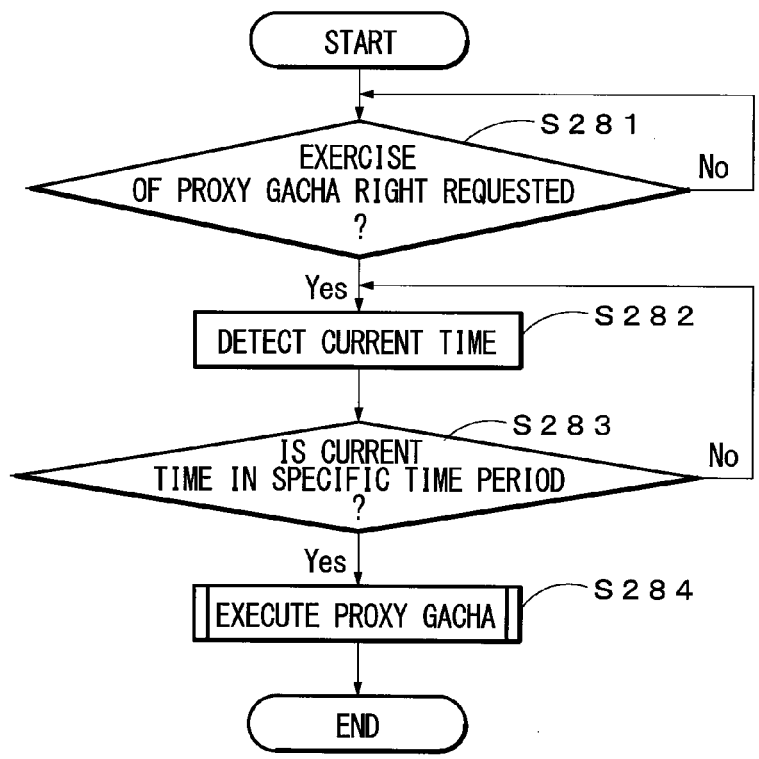
F I G. 2 8

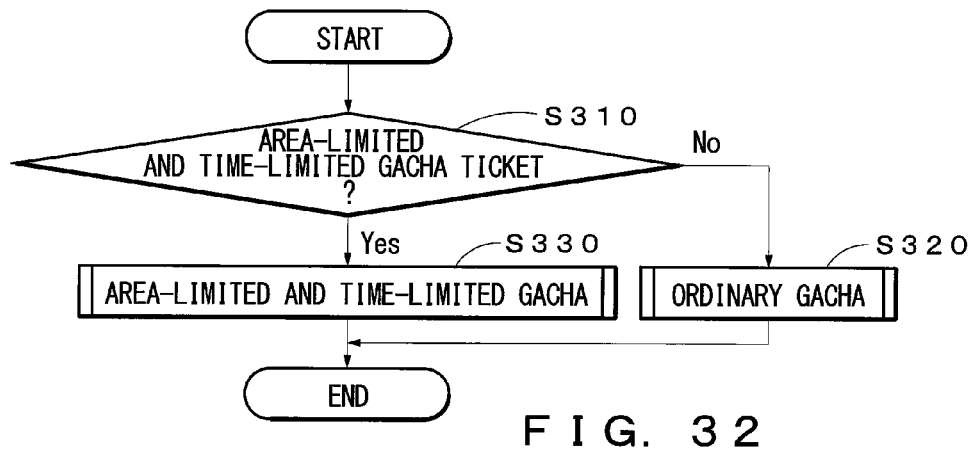
F I G. 32
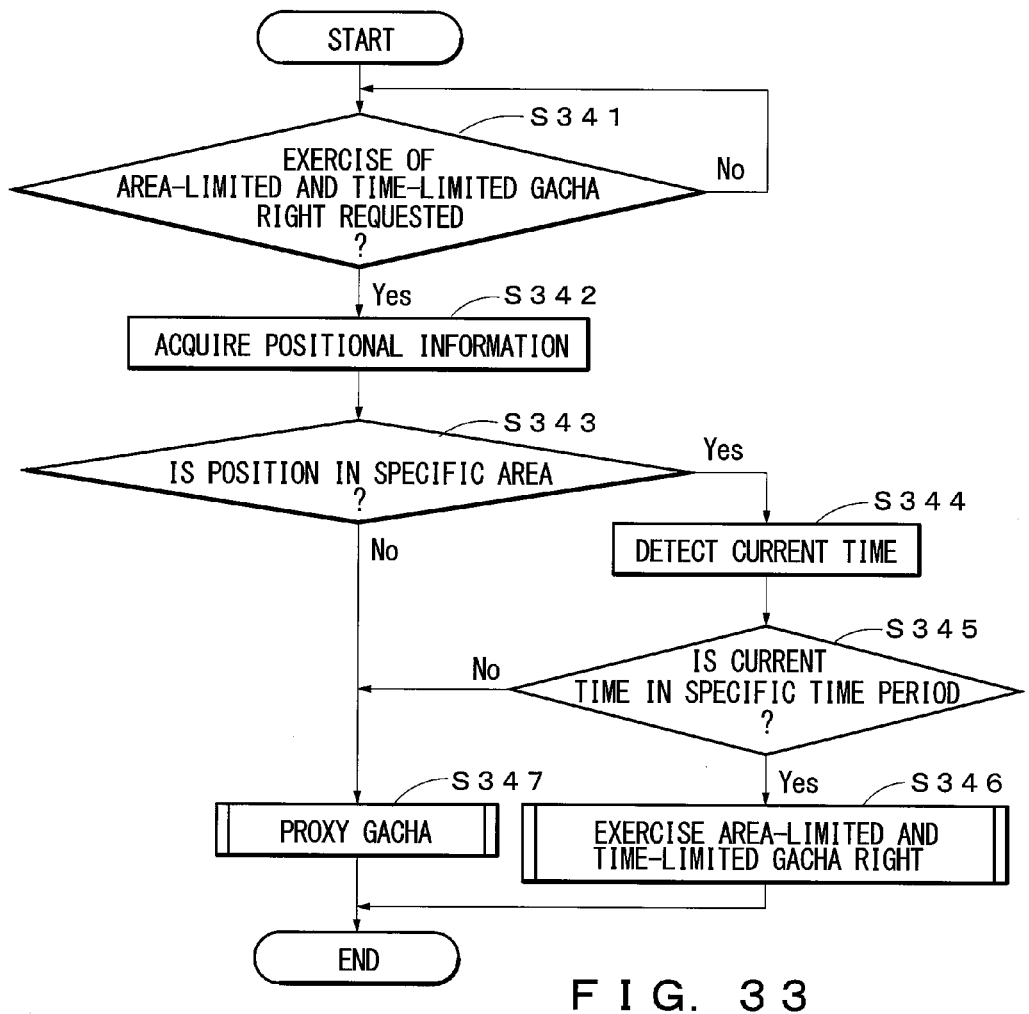
F I G. 33

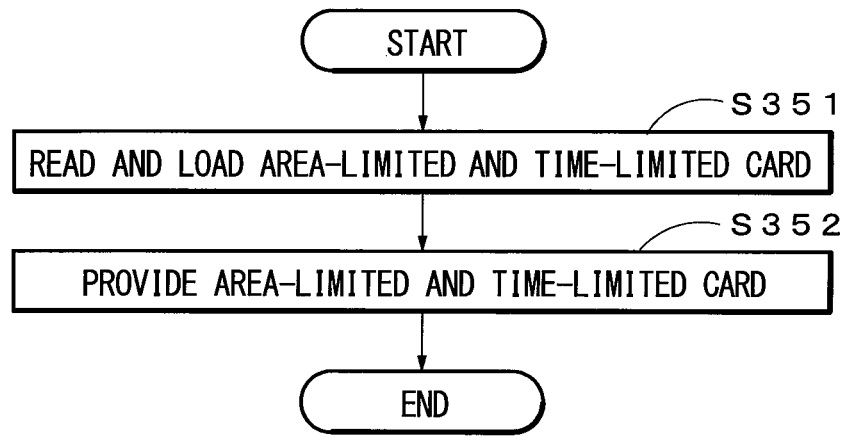
F I G. 3 4
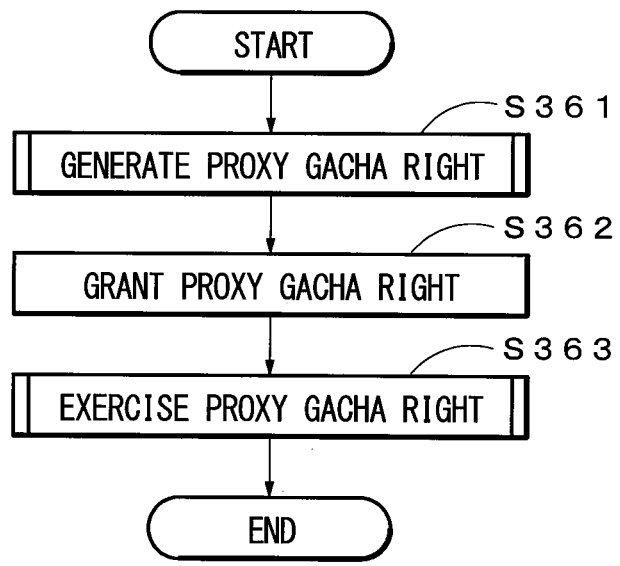
F I G. 3 5

GAME SERVER THAT ALLOWS ONLINE GAME USER TO DESIGNATE PROXY TO EXERCISE AN AREA LIMITED ACQUISITION RIGHT, GAME CONTROLLING METHOD THEREOF, GAME SYSTEM, AND NON-TRANSITORY COMPUTER-READABLE MEDIUM

CROSS REFERENCE TO RELATED APPLICATIONS

This application claims the benefit of Japanese Patent Application No. 2012-211479 filed Sep. 25, 2012, which is hereby incorporated by reference in its entirety.

TECHNICAL FIELD

The present disclosure relates to a game server that manages an action of a virtual user (user object) existing in a virtual space by operation of each terminal connected to the Internet, a controlling method thereof, a non-transitory computer-readable medium, and a game system.

BACKGROUND ART

Recently, social network games (hereinafter referred to as social games), which are games provided using a Social Networking Service (SNS), are becoming more common with the spread of high-end portable terminals such as smartphones. A social game is an online game offered via a communication network and played while a user (physical user) communicates with another user (another physical user) through a virtual user. A virtual user is an object existing in a virtual space (virtual world established in the game) that acts in response to the operation of a user (physical user).

For example, one of such types of social games may be a game in which a plurality of game parts such as a quest part, a battle part, a combination part, and a gacha part are organically connected to constitute a single game that creates a world of unique images. In a gacha part, which is a part that constitutes a single game as explained above, a virtual user may exercise a gacha right that has been granted to the virtual user upon satisfaction of a predetermined condition of the game, such as an accomplishment of a mission or a use of actual money in the game. A virtual user may obtain at least one card each time the gacha right is exercised. A card is one type of virtual item (item object) that can be used only in the game. A card is an image of a trading card having an illustration of a monster or a human character (e.g., a baseball or soccer player) appearing in the game. The cards are displayed on the terminal of the user that has obtained the card. The gacha right is a right to request a system, in which a gacha part is embodied in the game, to provide a card and allow the card to be acquired. Exercising the gacha right is typically referred to as, e.g., "to gacha", "gachaing", and "to perform gacha". This reference comes from the term "Gacha-Gacha™" expressing the sound and manner in which a capsule toy, which is a toy enclosed in a capsule, is ejected from a toy vending machine after a coin is inserted into the toy vending machine and the lever is turned. The gacha right is used as one means for delivery and receipt of an item in the game (Japanese Laid-Open Patent Publication No. 2012-24248).

Another well-known type of game other than a social game is disclosed in Japanese Laid-Open Patent Publication No. 2012-24248. When a cellular phone user travels to a certain area and plays the aforementioned type of game, the user may acquire an item limited to the area.

In today's social games, the gacha right is not distributable. Only the virtual user that first obtains the gacha right is entitled to exercise it. For example, as disclosed in Japanese Laid-Open Patent Publication No. 2012-24416, the gacha right can be used as a means for delivering and receiving a card in a game in which an item limited to the area of a cellular phone can be obtained. To acquire an area-limited card, the user (physical user) of the cellular phone, who controls the virtual user having acquired the gacha right, needs to travel to the aforementioned area, play the game using the aforementioned cellular phone, and exercise the gacha right. If the specific area is in the daily travel area of the user (physical user), it is easy for the user to travel to the specific area to exercise the gacha right. Conversely, when the specific area is outside the daily travel area of the user, it is difficult for the user (physical user) to travel to the area and exercise the gacha right. For example, for an elementary school student in Tokyo to acquire a card limited to New York, the student must travel to New York to acquire the gacha right. Since New York is far away from the daily travel area of the student in Tokyo, traveling to New York to exercise the gacha right is difficult for the student. Unless the period when the gacha right can be used is set to a period of a long-term vacation, such as a summer vacation, it is literally impossible for the student in Tokyo to exercise the gacha right.

SUMMARY

The present disclosure has been contrived based on the aforementioned disadvantages. It is an object of the present disclosure to provide a game server, a game controlling method, a non-transitory computer-readable medium, and a game system. By virtue thereof, one virtual user may exercise the acquisition right for acquiring a card and other items as a proxy even when the acquisition right has been granted to another virtual user, thereby stimulating an interest in social games.

[Game Server]

The game server of the present disclosure is a server computer for embodying, via the Internet, a social game in which physical users operate their respective terminals and build a relationship with other physical users through control of their respective virtual users in a virtual space. The game server has the following aspects.

[Aspect 1.1]

A game server of Aspect 1.1 comprises an acquisition right granting section, a proxy right generating section, a proxy right granting section, a proxy right exercising section, and an item providing section. The acquisition right granting section grants a right for acquiring an item in a virtual space, wherein the acquisition right is granted to the first virtual user in the virtual space that is controllable via the terminal of the first physical user connected to the Internet. In response to a request via the terminal of the first physical user, the proxy right generating section generates a proxy right for the second virtual user to exercise the acquisition right as a proxy. The second virtual user in the virtual space that is controllable via the terminal of the second physical user connected to the Internet. The proxy right granting section grants the proxy right, which has been generated by the proxy right generating section, to the second virtual user. The proxy right exercising section exercises the proxy right by the second virtual user. Based on the acquisition right for which the proxy right has been exercised by the proxy right exercising section, the item providing section provides only the first virtual user with the item.

By the game server thus configured, the proxy right for the acquisition right, which has been granted to the first virtual user, is granted to the second virtual user. When the proxy right is exercised by the second virtual user, the acquisition right is exercised by the second virtual user on a proxy basis. An item that has been made acquirable by exercise of the acquisition right on a proxy basis is not provided to the second virtual user having exercised the proxy right. Instead, the item is provided to the first virtual user who is the holder of the acquisition right.

It can be difficult for the first physical user to control the first virtual user via the terminal thereof to exercise the acquisition right for acquiring the item. Even in the foregoing situation, by granting the proxy right for the acquisition right to the second virtual user and having the second virtual user exercise the proxy right, the first physical user may indirectly exercise the acquisition right for acquiring the item.

[Aspect 1.2]

The game server of Aspect 1.1 comprises an area-limited item storing section, a positional information acquisition section, and an item information reading and loading section. The area-limited item storing section stores an area-limited item, which is made acquirable by exercise of the acquisition right, in association with a position in the physical space. The positional information acquisition section acquires the position of the terminal of the second physical user. From the area-limited item storing section, the item information reading and loading section reads and loads an area-limited item corresponding to the position acquired by the positional information acquiring section. When the position acquired by the positional information acquiring section is in a specific area of the physical space, the proxy right exercising section exercises the proxy right by the second virtual user. Based on the acquisition right for which the proxy right has been exercised by the proxy right exercising section, the item providing section provides the first virtual user with the area-limited item read and loaded by the item information reading and loading section.

By the game server thus configured, the proxy right for the acquisition right, which has been granted to the first virtual user, is granted to the second virtual user. When the terminal of the second physical user is in a specific area and the proxy right is exercised by the second virtual user, the acquisition right is exercised by the second virtual user on a proxy basis. The area-limited item, which has been made acquirable by exercise of the acquisition right through a proxy, is not provided to the second virtual user having exercised the acquisition right as a proxy. Instead, the item is provided to the first virtual user that is the holder of the acquisition right.

It can be difficult for the first physical user to travel to a specific area where an area-limited item can be acquired and control, via the terminal thereof, the first virtual user to exercise the acquisition right for acquiring the area-limited item. Even in the foregoing situation, the first physical user may have the second virtual user exercise the proxy right. The first physical user may indirectly exercise the acquisition right for acquiring the aforementioned area-limited item.

[Aspect 1.3]

The game server according to Aspect 1.1 comprises an area-limited item storing section, a positional information acquiring section, and an item information reading and loading section. The area-limited item storing section stores an area-limited item in association with a position in the physical space wherein the area-limited item is made acquirable by exercise of the acquisition right. The positional information acquiring section acquires the position of the terminal of the second physical user. The item information reading and loading section reads and loads, from the area-limited item storing section, an area-limited item corresponding to the position acquired by the positional information acquisition section. When the position acquired by the positional information acquisition section is in a specific area, the proxy right exercising section exercises the acquisition right by the second virtual user on a proxy basis in response to a request for exercise of the proxy right via the terminal of the second physical user. Based on the acquisition right for which the proxy right has been exercised by the proxy right exercising section, the item providing section provides the first virtual user with the area-limited item read and loaded by the item information reading and loading section.

By the game server thus configured, the proxy right for the acquisition right, which has been granted to the first virtual user, is granted to the second virtual user. When the terminal of the second physical user is in a specific area and the proxy right is exercised by the second virtual user in response to a request for exercise of the proxy right via the terminal of the second physical user, the acquisition right is exercised by the second virtual user on a proxy basis. The area-limited item, which has been made acquirable by exercise of the acquisition right through a proxy, is not provided to the second virtual user having exercised the acquisition right as a proxy. Instead, the item is provided to the first virtual user that is the holder of the acquisition right.

It can be difficult for the first physical user to travel to a specific area where an area-limited item can be acquired and control, via the terminal thereof, the first virtual user to exercise the acquisition right for acquiring the area-limited item. Even in the foregoing situation, the first physical user may have the second virtual user exercise the proxy right. The first physical user may indirectly exercise the acquisition right for acquiring the aforementioned area-limited item.

[Aspect 1.4]

The game server of Aspect 1.1 comprises a time-limited item information storing section, a time detecting section, and an item information reading and loading section. In the time-limited item information storing section, a time-limited item that has been made acquirable by exercise of the acquisition right is stored in association with a time period. The time detecting section detects the current time. From the time-limited item information storing section, the item information reading and loading section reads and loads a time-limited item corresponding to the time period of the time detected by the time detecting section. The proxy right exercising section exercises the proxy right by the second virtual user when the time detected by the time detecting section is within a specific time period. Based on the acquisition right for which the proxy right has been exercised by the proxy right exercising section, the item providing section provides the first virtual user with the time-limited item read and loaded by the item information reading and loading section.

By the game server configured as described above, the proxy right for the acquisition right, which has been granted to the first virtual user, is granted to the second virtual user. When the proxy right is exercised by the second virtual user within a specific time period, the acquisition right is exercised by the second virtual user on a proxy basis. The time-limited item, which has been made acquirable by exercise of the acquisition right on a proxy basis, is not provided to the second virtual user having exercised the acquisition right as a proxy. Instead, the item is provided to the first virtual user that is the holder of the acquisition right.

It can be difficult for the first physical user to control, via the terminal thereof, the first virtual user within a specific time period to exercise the acquisition right for acquiring a time-limited item that can be acquired in the aforementioned time period. Even in the foregoing situation, the first physical user may have the second virtual user exercise the proxy right. The first physical user may indirectly exercise the acquisition right for acquiring the aforementioned time-limited item.

[Aspect 1.5]

In the game server according to Aspects 1.1 to 1.4, the proxy right generating section comprises a proxy user displaying and showing section, a proxy user selecting section, and a proxy user designating section. The proxy user displaying and showing section displays and shows at least one virtual user to the first virtual user, wherein the displayed and shown virtual user can be the second virtual user. The proxy user selecting section allows the first virtual user to select one virtual user from among the plurality of virtual users displayed and shown by the proxy user displaying and showing section. The proxy user designating section designates, as the second virtual user, the one virtual user selected by the proxy user selecting section.

The game server thus configured displays and shows, to the first virtual user, candidates of a second virtual user—in other words, a plurality of candidate virtual users that may exercise the proxy right. The game server allows the first virtual user to select one virtual user from among the plurality of candidate virtual users, and the selected virtual user is designated as the second virtual user.

It can be difficult for the first physical user to control, via the terminal thereof, the first virtual user to exercise the acquisition right for acquiring a certain item. Even in the foregoing situation, the game server allows the first physical user to select one from among the plurality of displayed and shown candidate virtual users and have the virtual user selected as the second virtual user exercise the proxy right. The first physical user may indirectly exercise the acquisition right for acquiring the aforementioned item.

[Game Control Method]

The game controlling method of the present disclosure is a control method for embodying, via the Internet, a social game in which physical users operate their respective terminals and build a relationship with other physical users through control of their respective virtual users in a virtual space. The game control method has the following aspect.

[Aspect 2.1]

The game controlling method of Aspect 2.1 is performed by a computer connected to the Internet. The method comprises an acquisition right granting step, a proxy right generating step, a proxy right granting step, a proxy right exercising step, and an item providing step. In the acquisition right granting step, an acquisition right is granted for acquiring an item in a virtual space, wherein the acquisition right is granted to the first virtual user in the virtual space that is controllable via the terminal of the first physical user connected to the Internet. In the proxy right generating step, in response to a request via the terminal of the first physical user, a proxy right is generated for the second virtual user in the virtual space that is controllable via the terminal of the second physical user connected to the Internet, to exercise the acquisition right as a proxy. In the proxy right granting step, the proxy right is granted to the second virtual user. In the proxy right exercising step, the acquisition right by the second virtual user as a proxy is exercised based on the proxy right. In the item providing step, based on the acquisition right for which the proxy right has been exercised, the item is provided only to the first virtual user.

By the game control method thus configured, the proxy right for the acquisition right, which has been granted to the first virtual user, is granted to the second virtual user. When the proxy right is exercised by the second physical user, the acquisition right is exercised by the second virtual user as a proxy. An item that has been made acquirable by exercise of the acquisition right on a proxy basis is not provided to the second virtual user having exercised the proxy right. Instead, the item is provided to the first virtual user that is the holder of the acquisition right.

It can be difficult for the first physical user to control, via the terminal thereof, the first virtual user to exercise the acquisition right for acquiring a certain item. Even in the foregoing situation, the first physical user may grant the proxy right for the acquisition right to the second virtual user and have the second virtual user exercise the proxy right. The first physical user may indirectly exercise the acquisition right for acquiring the aforementioned item.

[Non-Transitory Computer-Readable Medium]

The non-transitory computer-readable medium of the present disclosure is a non-transitory computer-readable medium for embodying, via the Internet, a social game in which physical users operate their respective terminals and build a relationship with other physical users through control of their respective virtual users in a virtual space. The non-transitory computer-readable medium of the present disclosure has the following aspect.

[Aspect 3.1]

The non-transitory computer-readable medium of Aspect 3.1 performs an acquisition right granting step, a proxy right generating step, a proxy right granting step, a proxy right exercising step, and an item providing step. In the acquisition right granting step, an acquisition right for acquiring an item in a virtual space is granted to the first virtual user in a virtual space, wherein the first virtual user is controllable via the terminal of the first physical user connected to the Internet. In the proxy right generating step, in response to a request from the first physical user, a proxy right is generated for the second virtual user in the virtual space, which is controllable via the terminal of the second physical user connected to the Internet, to exercise the acquisition right as a proxy. In the proxy right granting step, the proxy right is granted to the second virtual user. In the proxy right exercising step, the proxy right by the second virtual user is exercised based on the proxy right. In the item providing step, based on the acquisition right for which the proxy right has been exercised, the item is provided to the first virtual user.

By using an Internet-connected computer to execute a program stored in the non-transitory computer-readable medium, the game server of Aspect 1.1 and the game control method of Aspect 2.1 can be embodied.

[Game System]

The game system of the present disclosure is a computer system for embodying, via the Internet, a social game in which physical users operate their respective terminals and build a relationship with other physical users through control of their respective virtual users in a virtual space. The game system of the present disclosure has the following aspect.

[Aspect 4.1]

In the game system of Aspect 4.1, in which a game server and a plurality of terminals are comprised, the game server and the plurality of terminals are connected via the Internet. The game server comprises an acquisition right granting section, a proxy right generating section, a proxy right granting section, a proxy right exercising section, and an item providing section. The acquisition right granting section grants an acquisition right for acquiring an item in a virtual space, wherein the acquisition right is granted to the first virtual user in the virtual space that is controllable via the terminal of the first physical user connected to the Internet. In response to a request via the terminal of the first physical user, the proxy right generating section generates a proxy right for the second virtual user in the virtual space, which is controllable via the terminal of the second physical user connected to the Internet, to exercise the acquisition right as a proxy. The proxy right granting section grants the proxy right, which has been generated by the proxy right generating section, to the second virtual user. The proxy right exercising section exercises the proxy right by the second virtual user. The item providing section, based on the acquisition right for which the proxy right has been exercised by the proxy right exercising section, provides the first virtual user with the item.

By the game system thus configured, the proxy right for the acquisition right, which has been granted to the first virtual user, is granted to the second virtual user. When the proxy right is exercised by the second virtual user, the acquisition right is exercised by the second virtual user on a proxy basis. An item that has been made acquirable by exercise of the acquisition right on a proxy basis is not provided to the second virtual user that exercised the proxy right. Instead, the item is provided to the first virtual user that has acquired the acquisition right.

It can be difficult for the first physical user to control the first virtual user via the terminal thereof to exercise the right to acquire an item. Even in the foregoing situation, by granting the proxy right for the acquisition right to the second virtual user and having the second virtual user exercise the proxy right, the first physical user may indirectly exercise the acquisition right for acquiring the item.

Effect of Disclosure

According to the present disclosure, the acquisition right for acquiring a card or other game items can be exercised on a proxy basis by a virtual user other than the one having acquired the acquisition right. This proxy right creates a new relationship between the virtual user having acquired the acquisition right and the virtual user that may exercise the aforesaid right as a proxy in a social game. Therefore, this novel relationship stimulates an interest in social games.

BRIEF DESCRIPTION OF DRAWINGS

FIG. 1 is a diagram showing a configuration of a game system to which the present disclosure is applied.

FIG. 7 is a flowchart showing an example process of a gacha executing step.

FIG. 8 is a flowchart showing an example process of an ordinary gacha step.

FIG. 9 is a flowchart showing an example process of an ordinary gacha right exercising step.

FIG. 12 is a flowchart showing an example process of a proxy gacha step.

FIG. 13 is a flowchart showing an example process of a proxy gacha right generating step.

FIG. 14 is a flowchart showing an example process of a proxy gacha right exercising step.

FIG. 15 is a flowchart showing an example process of a proxy gacha executing step.

FIG. 19A is a diagram showing an example data structure of a gacha right holder storing section; FIG. 19B is a diagram showing an example data structure of a card holder storing section; and FIG. 19C is a diagram showing an example data structure of a proxy gacha right information storing section.

FIG. 21 is a diagram showing an example of an ordinary card display screen.

FIG. 24 is a flowchart showing an example process of a gacha executing step.

FIG. 27 is a flowchart showing an example process of a proxy gacha step.

FIG. 28 is a flowchart showing an example process of a proxy gacha right exercising step.

FIG. 29 is a flowchart showing an example process of a proxy gacha executing step.

FIG. 32 is a flowchart showing an example process of a gacha exercising step.

FIG. 33 is a flowchart showing an example process of an area-limited gacha step.

FIG. 34 is a flowchart showing an example process of an area-limited gacha right exercising step.

FIG. 35 is a flowchart showing an example process of a proxy gacha step.

DETAILED DESCRIPTION OF EMBODIMENTS

Figure 2:
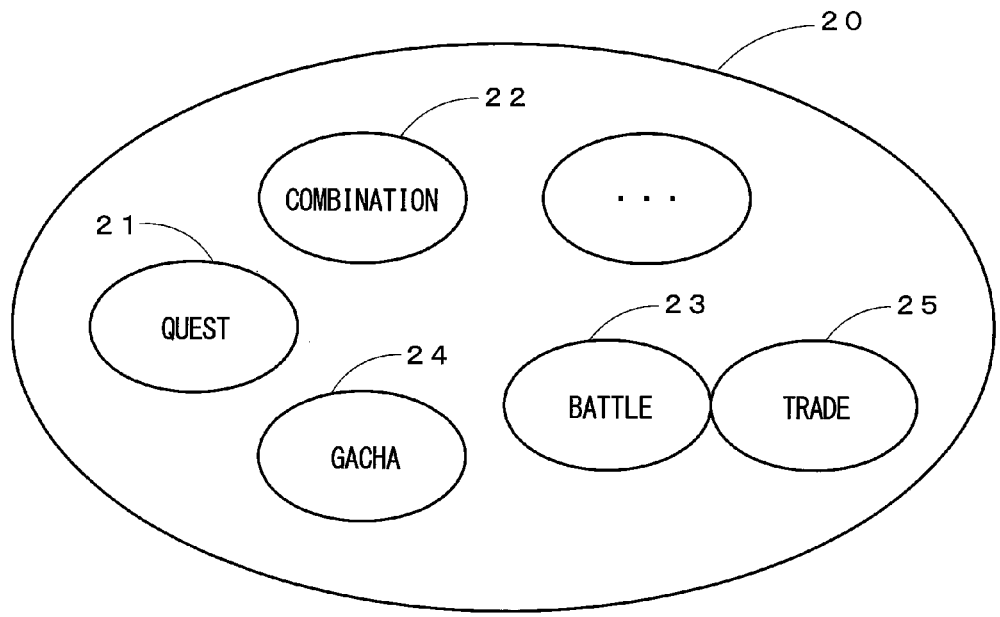
FIG. 2 is a diagram showing a configuration of a social game provided by a game server to which the present disclosure is applied.

Further features of the present disclosure will become apparent from the following detailed description of exemplary embodiments with reference to the accompanying drawings.

As shown in FIG. 1, a game system G of the present embodiment is a computer network system comprising: a game server 1; an Internet 2; and terminals 3a, 3b, 3c, ..., 3n (hereinafter collectively referred to as the "terminal 3"). The game server 1 is a computer (server computer) that provides various services relating to a social game embodied by the game system G, and the terminal 3 is a computer (client computer) that receives the services.

(1) Definitions of Terms

The definitions of terms used in the present embodiment are as follows.

"Virtual space" means a virtual world that is created when the game server 1 executes a program stored on a non-transitory computer-readable medium for embodying the game system G.

"Physical user" is an entity who operates the terminal 3—in other words, a human living in the actual world.

"Virtual user" is an object existing in a virtual space instead of the physical user and acts according to an instruction via the terminal 3 of the physical user. "Virtual user" may be a visual object—in other words, an object appearing as one image of a game character (monster, human, animal, etc.) in an image representing a virtual space. Also, "virtual user" may be a non-visual object that is not visually recognizable when existing as an entity acting in a virtual space.

"Card" is one type of item (item object) existing in a virtual space. A card is supplied to a virtual user as an image representing a trading card of a game character. The card is displayed at the terminal 3 of the physical user who controls the virtual user having acquired the card.

"Gacha right" is a right of a virtual user to request that the system, which embodies a gacha part in the game, provide a card in order to acquire the card. Only the virtual user that first acquires the right is entitled to exercise the gacha right. There are three types of gacha rights: area-limited, time-limited, and non-limited (ordinary).

"Area-limited gacha right" is a gacha right to obtain an area-limited card according to the area of the globe where the terminal 3, which is operated by a physical user of a virtual user having acquired the gacha right, exists.

"Time-limited gacha right" is a gacha right to acquire a card limited to the time period when the gacha right is exercised. Examples of the "time periods" of a day are morning, afternoon, and night, and examples of the "time periods" of a year are spring, summer, fall, and winter.

"Ordinary gacha right" is a gacha right unlike the aforementioned area-limited gacha right and time-limited gacha right. This right can be exercised to acquire a card without regard to any limitations such as area or time period.

"Proxy gacha right" is a gacha right which allows a virtual user (second virtual user) other than the virtual user that holds a gacha right (first virtual user) to exercise the gacha right as a proxy.

(2) Outline of Social Game

A social game of the present embodiment will be explained in reference to FIG. 2.

In a social game of the present embodiment, a physical user operates the terminal 3 to control a virtual user in a virtual space to create a set of a predetermined number of cards (hereinafter referred to as a card deck) that are selected from among cards of a hundred or more game characters (hereinafter referred to as a character). More specifically, the user strengthens and collects the cards by executing a battle against an enemy character appearing in the virtual space using the cards or by trading the cards with other virtual users, while upgrading a level and selecting an attribute of the card in the card deck. In a battle using the cards, damage to enemies and results of the battle are determined based on the level of offensive and defensive powers of each card constituting the card deck, a skill (corresponding to a "meld" as used in a card game or mahjong) with which a certain effect can be obtained by a predetermined combination of cards, and so on.

The social game is established as a whole with a plurality of parts being combined organically to constitute a game with a unique view of world and story. As shown in FIG. 2, a social game 20 of the present embodiment includes a quest part 21, a combination part 22, a battle part 23, a gacha-part 24 and a trade part 25, each part serving as a game element.

As represented by the term "quest", the quest part 21 is a part constituting a game that progresses as a virtual user quests in a virtual space, battles against an enemy character that appears during the quest, and improves the level of the virtual user. In the quest part 21, the virtual user is given predetermined quest points, and a movement of the virtual user and an improvement of the level are accomplished by consuming the quest points. In the quest part 21, by consuming a battle point and using the cards in possession of the virtual user, a battle against an enemy character that has appeared is executed. A virtual user having defeated an enemy character is given items and quest points based on the level or type of the enemy character. The items include a card and a gacha right.

The combination part 22 is a part in which cards possessed by the virtual user are combined to increase the strength of the cards, so as to increase an offensive power for damaging an enemy character or the virtual user of an opponent (enemy object) or a defensive power for defending from an enemy object during a battle.

The battle part 23 is a part in which the cards possessed by the virtual user are used to launch a battle against another virtual user. A win or a loss is determined based on the offensive power and the defensive power of each of the cards described above.

The gacha part 24 is a part by which a virtual user exercises a gacha right. Gacha rights include those acquired by the quest part 21 and those obtained through a purchase. A virtual user can acquire at least one card every time the user exercises a gacha right. The occurrence rate of a card, in other words, a probability of acquiring a certain card by exercising a gacha right, is set differently for each card. By exercising a gacha right, a virtual user acquires a card randomly based on the occurrence rate thereof.

The trade part 25 is a part through which the virtual user exchanges the cards in its own possession with another virtual user. Each virtual user adds profitable cards obtained by using the trade part 25 into a card deck to strengthen the offensive power for damaging an enemy object or the defensive power for defending from an enemy object that is attacking during the battle.

The social game 20 including the plurality of parts described above is not independent from other game parts, and, as described above, each part is associated or combined with each other to become meaningful as an entire game. Therefore, with the social game 20, a single game can be progressed as an entirety with the virtual user causing each game part to progress effectively.

(3) Basic Hardware Configuration

(3-1) Configuration of Terminal

Hereinafter, a hardware configuration for embodying a game system G will be described.

As shown in FIG. 1, the terminal 3, which is a portable terminal with a web-browsing feature, comprises a wireless communication section 31, a display section 32, and an operation input section 33. A specific example of the terminal 3 is smartphones that have rapidly spread all over the world in recent years.

Via the wireless communication section 31, the terminal 3 is connected to the Internet 2 over a mobile telephone line or a wireless LAN circuit and communicates with the game server 1 by using the web browsing feature. The display section 32 uses this feature to display a game screen of images received from the game server 1. The operation input section 33 comprises a touch panel disposed on the front surface of the display section 32. Various operations can be performed by tapping the input entry area on the front surface of the display section 32 where the game screen is displayed.

The game server 1 performs an authentication process of the terminal 3 using a combination of a user ID and password registered in an unillustrated user management section. Upon completion of the authentication process, the game server 1 transmits, to the terminal 3, image data of a game image and other types of data necessary for progression of a game and enables reception of operations via the terminal 3.

The terminal 3 may be a mobile telephone or a personal computer as long as it is a communication device with a web-browsing feature. A touch panel is described as an example of the operation input section 33, but operation input section 33 may be of a configuration in which various operations can be performed for playing the game by buttons and keys.

(3-2) General Configuration of Game Server

Figure 3:
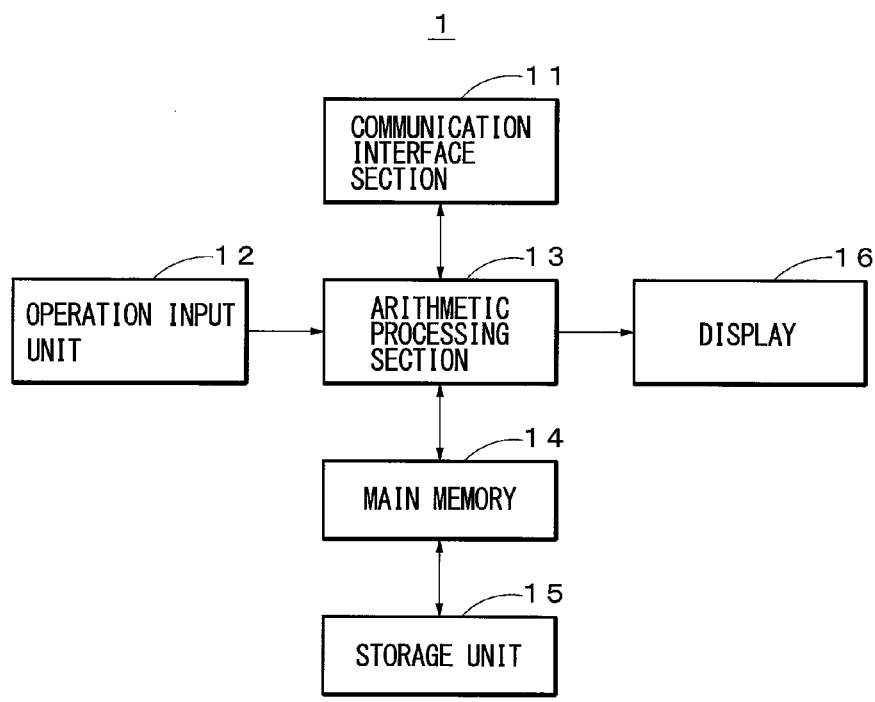
FIG. 3 is a diagram for explaining a hardware configuration of the game server to which the present disclosure is applied.

The game server 1 is embodied as a computer having a general-purpose hardware configuration as shown in FIG. 3. That is to say, as shown in FIG. 3, the game server 1 includes a communication interface section 11 that establishes communications with the terminal 3 via the Internet 2, and an operation input unit 12 that accepts an operation input from a general input device, such as a keyboard or a mouse. Further, the game server 1 is provided with an arithmetic processing section 13 such as a CPU (central processing unit) that executes various arithmetic processing, a main memory 14 such as an SRAM or a DRAM that temporarily stores arithmetic processing data, a storage unit 15 such as a hard disk in which a non-transitory computer-readable medium and various data are stored, and a display 16 that displays an outcome of the arithmetic process.

Figure 4:
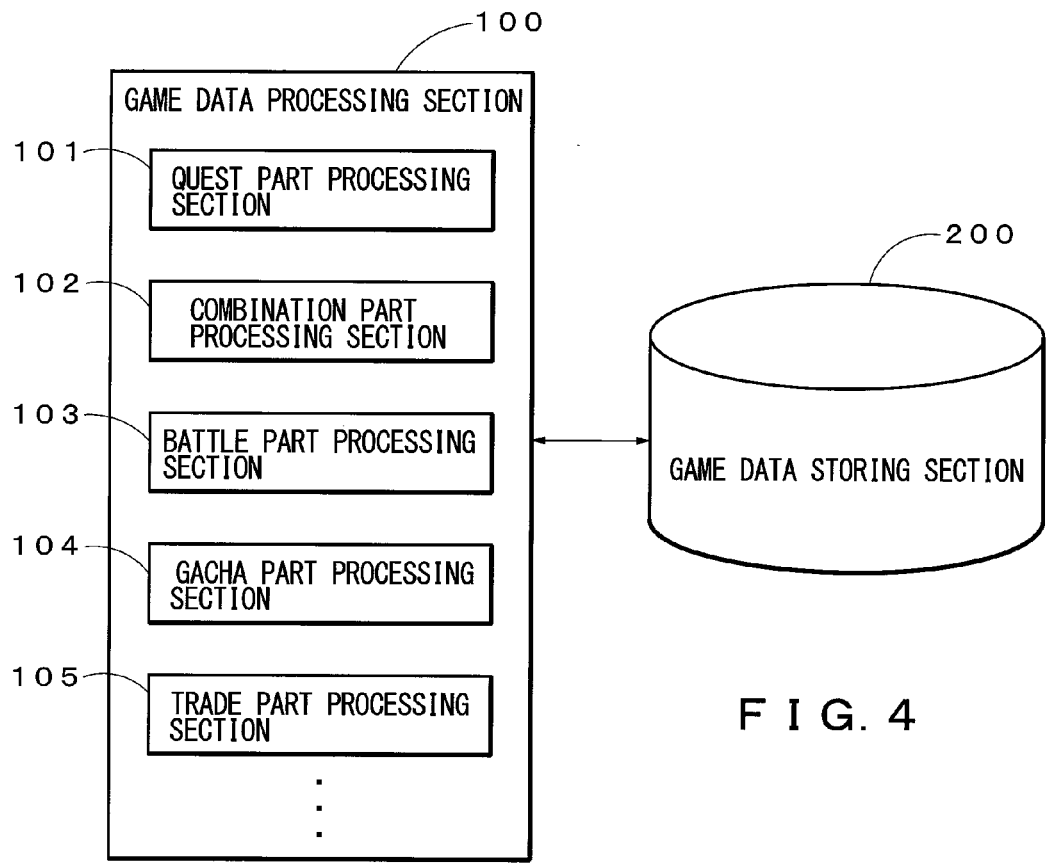
FIG. 4 is a diagram of a configuration of each processing section whose process is executed by the game server to which the present disclosure is applied.

In the game server 1, by installing a program for offering the social game 20 to a user in the storage unit 15 and executing the program using the arithmetic processing section 13, functional blocks as shown in FIG. 4 are embodied. That is to say, the game server 1 acts as a game data processing section 100 that is comprised of a quest part processing section 101, a combination part processing section 102, a battle part processing section 103, a gacha part processing section 104, and a trade part processing section 105. Also, the game server 1 acts as a game data storing section 200 that stores various types of data required for the social game 20.

Here, the quest part processing section 101 is a functional block that executes data processing for embodying the quest part 21. The combination part processing section 102 is a functional block that executes data processing for embodying the combination part 22. The battle part processing section 103 is a functional block that executes data processing for embodying the battle part 23. The gacha part processing section 104 is a functional block that executes data processing for embodying the gacha part 24. The trade part processing section 105 is a functional block that executes data processing for embodying the trade part 25.

(4-1) First Embodiment of Gacha Part 24

Figure 5:
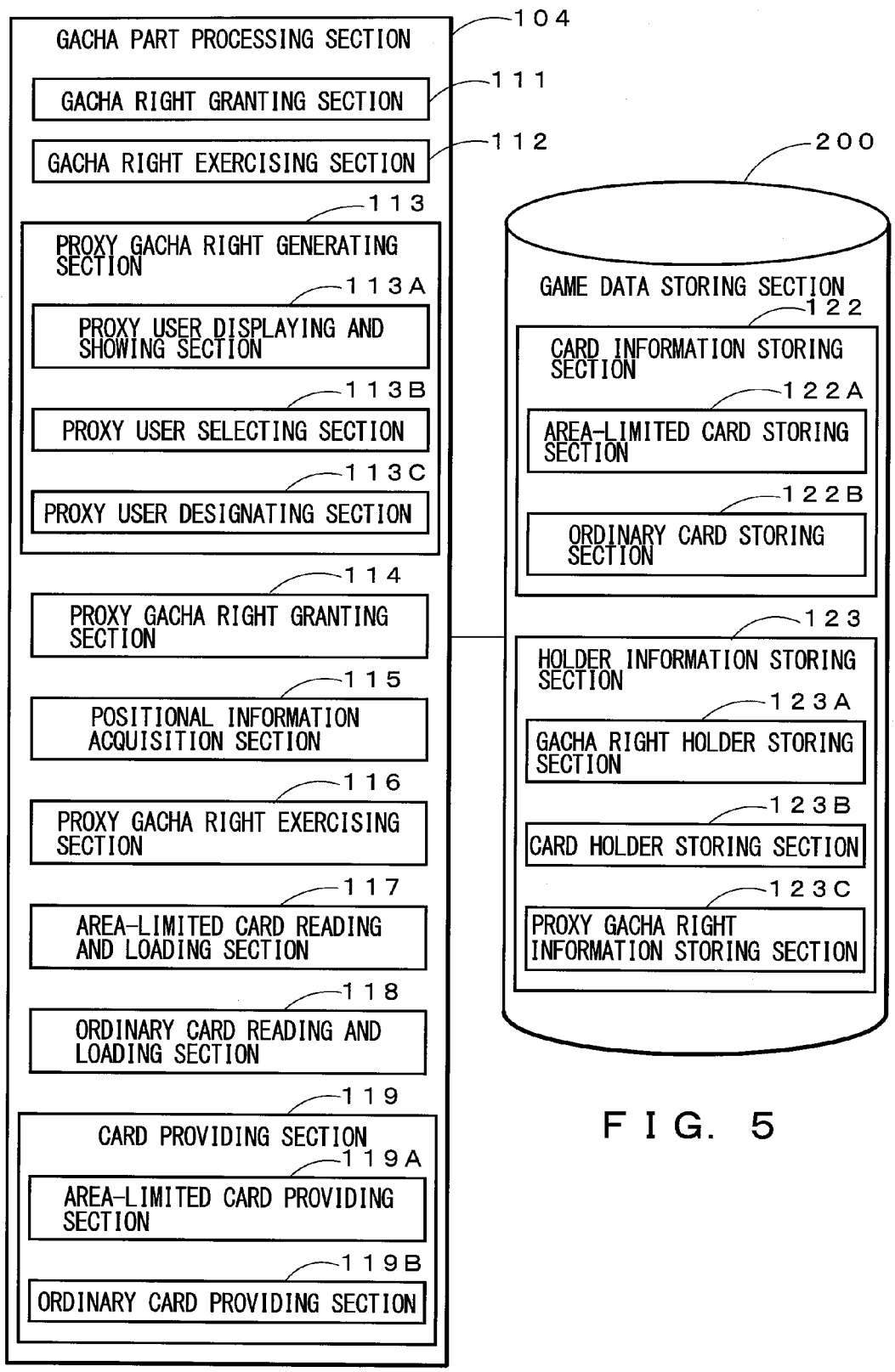
FIG. 5 is a block diagram showing configurations of a gacha part processing section and a game data storing section.

Of the parts of the social game 20, an embodiment for embodying the gacha part 24 will be explained in reference to FIG. 5. Hereinafter, the terminal 3a is a terminal of a first physical user, and the terminal 3b is a terminal of a second physical user. In this embodiment, examples of an area-limited gacha right and an ordinary gacha right that are granted to a virtual user will be explained.

(4-1-1) Configuration of Gacha Part Processing Section

The gacha part processing section 104 comprises a gacha right granting section (acquisition right granting section) 111, a gacha right exercising section (acquisition right exercising section) 112, a proxy gacha right generating section (proxy right generating section) 113, a proxy gacha right granting section (proxy right granting section) 114, a positional information acquisition section 115, a proxy gacha right exercising section (proxy right exercising section) 116, an area-limited card reading and loading section (item reading and loading section) 117, an ordinary card reading and loading section 118, and a card providing section (item providing section) 119.

The game data storing section 200 comprises a card information storing section 122 and a holder information storing section 123. The card information storing section 122 comprises an area-limited card storing section 122A and an ordinary card storing section 122B. The holder information storing section 123 comprises a gacha right holder storing section 123A, a card holder storing section 123B, and a proxy gacha right information storing section 123C.

By using the web browsing feature of terminal 3, the card information storing section 122 stores image data of various types of cards that can be displayed on a screen as part of a game. The area-limited card storing section 122A stores image data of area-limited cards, and the ordinary card storing section 122B stores image data of ordinary cards. The card information storing section 122 stores and manages image data of all cards in association with information for identifying each individual card (hereinafter referred to as "card identification information") (see FIG. 18).

The gacha right holder storing section 123A is a functional block that stores the ID of a gacha right (gacha right ID) and the gacha right holder (first virtual user) in such a manner that the ID and the holder correspond to each other (see FIG. 19A).

The card holder storing section 123B is a functional block that stores the holder of a gacha right (first virtual user) and the card identification information in such a manner that the holder and the information correspond to each other (see FIG. 19B).

The proxy gacha right information storing section 123C is a functional block that stores the holder of a proxy gacha right (second virtual user), the ID of the proxy gacha right (proxy gacha right ID), and the gacha right ID are related to each other (see FIG. 19C).

In the example of FIG. 7, the URI (Uniform Resource Identifier) of the card is used among the card identification information, and the ID of the terminal 3 (terminal ID) for controlling the virtual user is used as information to identify a virtual user.

The gacha right granting section 111 is a functional block that performs processing for granting an area-limited or ordinary gacha right to the first virtual user.

The gacha right exercising section 112 is a functional block that performs processing for the first virtual user to exercise the gacha right in response to the operation of the terminal 3a of the first physical user.

The proxy gacha right generating section 113 is a functional block that generates a proxy gacha right in response to a request via the terminal 3a of the first physical user. The proxy gacha right generating section 113 comprises a proxy user displaying and showing section 113A, a proxy user selecting section 113B, and a proxy user section 113C.

Figures 16, 18:
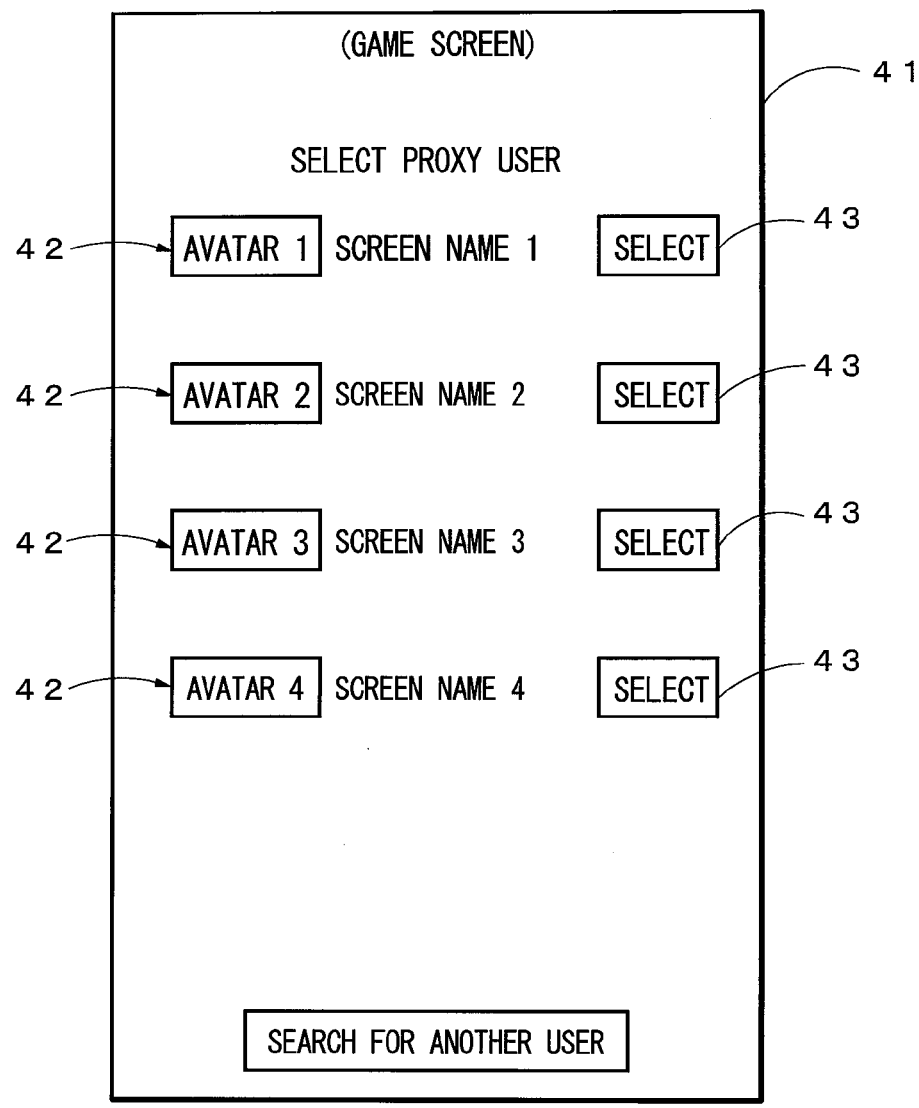
FIG. 16 is an example of a proxy user selection screen.
FIG. 18 is a diagram showing an example data structure of a card information storing section.

The proxy user displaying and showing section 113A is a functional block that performs processing for displaying and showing, to the first virtual user, at least one virtual user that can be a virtual user that may exercise the proxy gacha right—in other words, the second virtual user. Specifically, on a game screen displayed at the terminal 3a used for operating the first virtual user, the proxy user displaying and showing section 113A displays images of candidates of virtual users that can be a second virtual user. FIG. 16 shows an example proxy user selection screen. In this example, on a proxy user selection screen 41, which is displayed as a game screen, pairs of an avatar as a candidate image 42 and a screen name of a candidate are listed. For instance, as a candidate of the second virtual user, a virtual user registered as a friend of the first virtual user in the social game is selected.

The proxy user selecting section 113B is a functional block that performs processing for the first virtual user to select one virtual user from among at least one virtual user (at least one second virtual user candidate) displayed and shown by the proxy user displaying and showing section 113A. Specifically, the proxy user selecting section 113B performs processing for displaying and showing, on the game screen displayed at the terminal 3a operated by the first virtual user, an image of a select button for selecting a virtual user as a second virtual user. Also, the proxy user selecting section 113B performs processing for enabling acceptance of an instruction via the select button. In the example of FIG. 16, the select buttons 43, the candidate images 42, each of which represents an avatar, and screen names of candidates are displayed. The screen names are displayed on the right side of the candidate images 42. The select buttons 43, on each of which the word "Select" is indicated, are displayed on the right side of the screen names of the candidates.

The proxy user designating section 113C is a functional block that performs processing for designating, as the second virtual user, the virtual user selected by the proxy user selecting section 113B. Specifically, the proxy user designating section 113C performs processing to store information on game data storing section 200. The information is stored so that connections can be formed between pieces of data. The information is: the information which can identify the selected virtual user as the virtual user that may exercise the proxy gacha right (second virtual user) (e.g., the terminal ID of the terminal 3b used to control the second virtual user); the proxy gacha right; and the gacha right which is exercised on a proxy basis by the exercise of the proxy gacha right.

Figure 17:
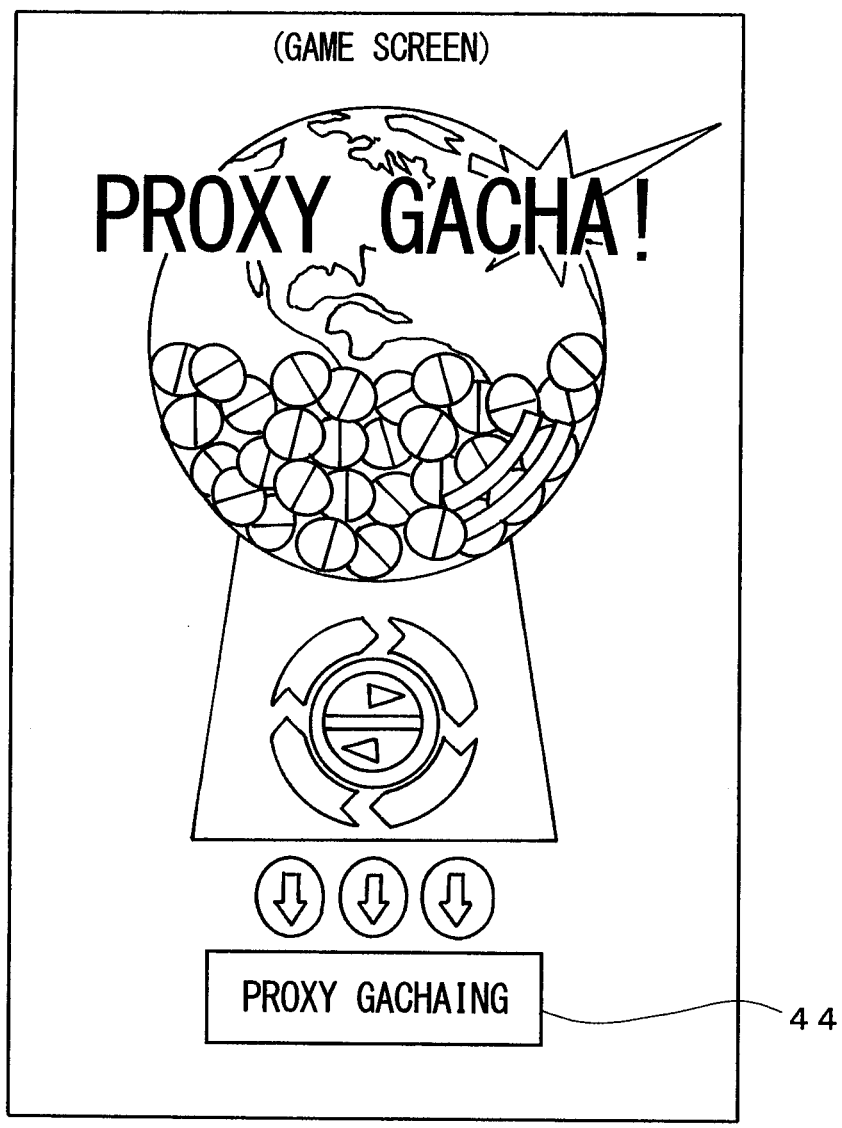
FIG. 17 is an example of a proxy gacha execution screen.

The proxy gacha right granting section 114 is a functional block that performs processing for granting a proxy gacha right, which is generated by the proxy gacha right generating section 113, to the virtual user designated as the second virtual user by the proxy user designating section 113C. Specifically, the proxy gacha right granting section 114 performs processing for displaying an image of a select button 44 (see FIG. 17) on the game screen displayed at the terminal 3b of the second physical user in order to instruct exercise of the proxy gacha right. Also, the proxy gacha right granting section 114 performs processing for enabling acceptance of an instruction via the select button 44.

The positional information acquisition section 115 is a functional block that performs processing for acquiring the position of the terminal 3b of the second physical user. A method of acquiring the position of the terminal 3b is not limited to any specific method. Examples of the method include a method of using positional information acquired by the GPS function equipped within the terminal 3b, a method of using positional information on the base station (e.g., latitude and longitude) from which the terminal 3b receives radio waves, and a method of using positional information that can be acquired from the IP address of the terminal 3b.

The proxy gacha right exercising section 116 is a functional block that performs processing for the second virtual user to exercise the proxy gacha right when the position acquired by the positional information acquisition section 115 is in a specific area of physical space.

The area-limited card reading and loading section 117 is a functional block that performs processing for reading and loading an area-limited card from the area-limited card storing section 122A based on the gacha right for which the proxy gacha right has been exercised by the second virtual user. In this context, "reading and loading an area-limited card" means, based on the occurrence rate set to each card, randomly extracting card identification information on one card, which corresponds to the position acquired by the positional information acquisition section 115, from the card identification information on a plurality of cards stored in the area-limited card storing section 122A. The "card identification information" is information that can be used for specifying a card or a location of the image data thereof such as the ID (Identification), file name, and URI of the card etc.

The ordinary card reading and loading section 118 is a functional block that performs processing for reading and loading an ordinary card from the ordinary card storing section 122B based on the gacha right exercised by the first virtual user oneself. In this context, "reading and loading an ordinary card" means, based on the occurrence rate set to each card, randomly extracting the card identification information on one card from the card identification information on a plurality of cards stored in the ordinary card storing section 122B.

The card providing section 119 comprises an area-limited card providing section 119A and an ordinary card providing section 119B.

The area-limited card providing section 119A is a functional block that performs processing for providing the first virtual user with the area-limited card read and loaded by the area-limited card reading and loading section 117 based on the gacha right for which the proxy gacha right has been exercised by the proxy gacha right exercising section 116.

The ordinary card providing section 119B is a functional block that performs processing for providing the first virtual user with the ordinary card read and loaded by the ordinary card reading and loading section 118 based on the gacha right exercised by the gacha right exercising section 112.

(4-2) Action of Gacha Part Processing Section

The action of the gacha part processing section 104, whose configuration is described above, will be explained below in reference to the flowcharts shown in FIGS. 6 to 15.

(4-2-1) Gacha Part Processing

Figure 6:
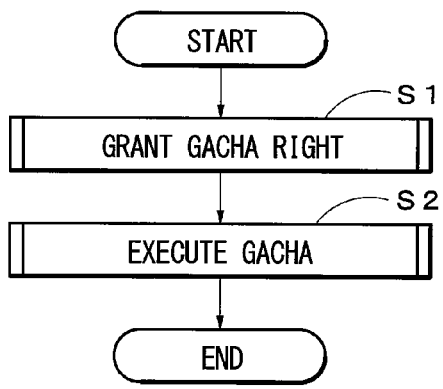
FIG. 6 is a flowchart showing an example process of gacha part processing.

FIG. 6 is a flowchart showing an example process (gacha part processing) of the gacha part processing section 104. In gacha part processing, gacha right granting step S1 and gacha execution step S2 are performed in sequence.

Figure 20A:
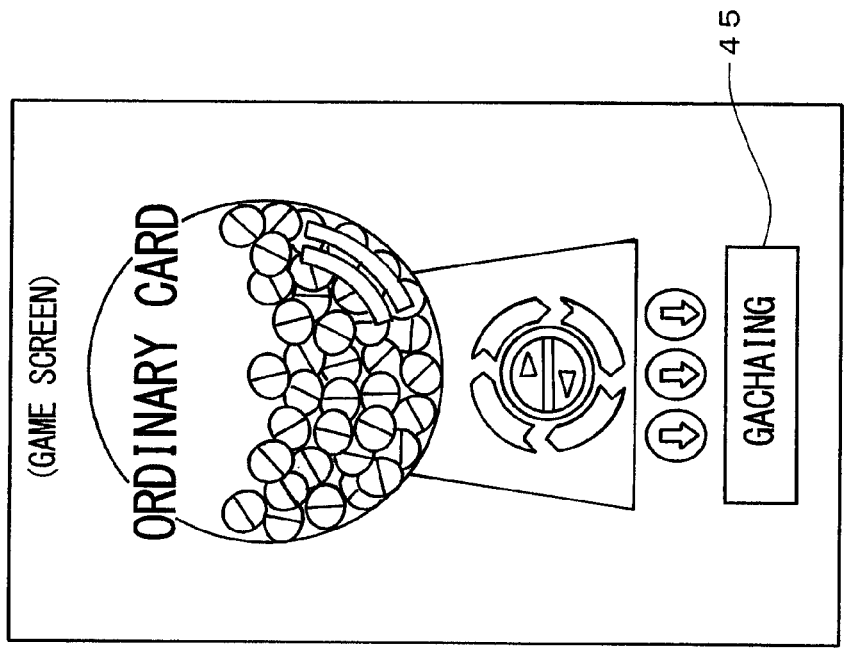
FIG. 20A is a diagram showing an example of a screen for exercising an example area-limited gacha right.
Figure 20B:
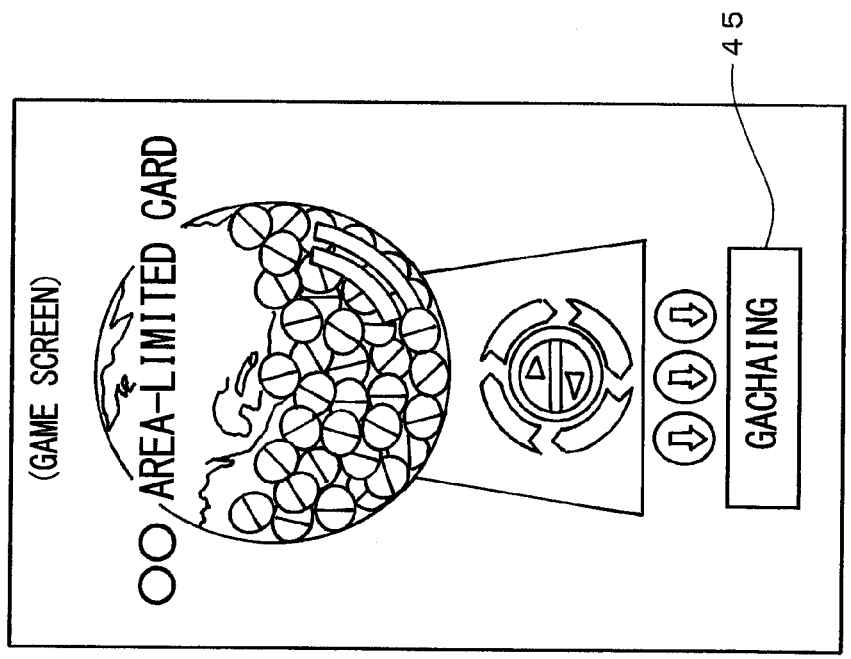
FIG. 20B is a diagram showing an example of a screen for exercising an ordinary gacha right.

Gacha right granting step S1 is a step of performing processing for granting an area-limited or ordinary gacha right to the first virtual user. In step S1, the gacha right holder storing section 123A stores the gacha right ID of the area-limited or ordinary gacha right and the terminal ID of the terminal 3a used to control the first virtual user that has acquired the aforementioned gacha right so that aforementioned IDs correspond to each other (see FIG. 19A). On the game screen displayed at the terminal 3a of the first physical user, processing for displaying images of the select buttons 45 (see FIGS. 20A and 20B) is performed for instructing exercise of the gacha right. Also, processing is performed for enabling of acceptance of an instruction via the select button 45.

Gacha executing step S2 is a step of performing processing for providing an area-limited or ordinary card, which is a card based on the gacha right, to the first virtual user having acquired the area-limited or ordinary gacha right.

(4-2-2) Gacha Execution Processing

FIG. 7 is a flowchart showing an example process of gacha executing step S2.

Gacha executing step S2 comprises gacha right determining step S110, ordinary gacha step S120, and area-limited gacha step S130.

Gacha right determining step S110 is a step of performing processing for determining whether the gacha right granted to the first virtual user is area-limited or ordinary. Upon determination that the gacha right is ordinary (S110: No), the process proceeds to ordinary gacha step S120. When the gacha right is area-limited (S110: Yes), the process proceeds to area-limited gacha step S130.

(4-2-3) Ordinary Gacha Processing

FIG. 8 is a flowchart showing an example process of ordinary gacha step S120.

Ordinary gacha step S120 comprises gacha right exercise request determining step S121 and ordinary gacha right exercising step S122.

Gacha right exercise request determining step S121 is a step of performing processing for determining whether exercise of the gacha right has been requested via the terminal 3a of the first physical user. Upon determination that exercise of the gacha right has been requested (S121: Yes), the process proceeds to ordinary gacha right exercising step S122.

FIG. 9 is a flowchart showing an example process of ordinary gacha right exercising step S122.

Ordinary gacha right exercising step S122 comprises ordinary card reading and loading step S131 and ordinary card providing step 132. Ordinary card reading and loading step S131 is a step of performing processing for reading and loading an ordinary card from the ordinary card storing section 122B based on the gacha right whose exercise has been requested. Ordinary card providing step S132 is a step of performing processing for providing the read and loaded ordinary card to the first virtual user having requested exercise of the gacha right.

When ordinary gacha right exercising step S122 is performed, the terminal ID of the terminal through which exercise of the ordinary gacha right is requested and the URI of the ordinary card read and loaded by exercise of the aforesaid gacha right are stored in the card holder storing section 123B in such a manner that the terminal ID and the URI are associated with each other (see FIG. 19B). Based on the information stored in the card holder storing section 123B, the HTML data of a game image containing the URI is transmitted to the terminal 3a of the first physical user identified by the terminal ID.

Upon completion of the foregoing process, the first virtual user having acquired the ordinary gacha right is registered as the holder of the ordinary card based on the ordinary gacha right. At the same time, the game image (see FIG. 21) containing an image of the ordinary card can be displayed on the terminal 3a of the first physical user.

(4-2-4) Area-Limited Gacha Processing

Figure 10:
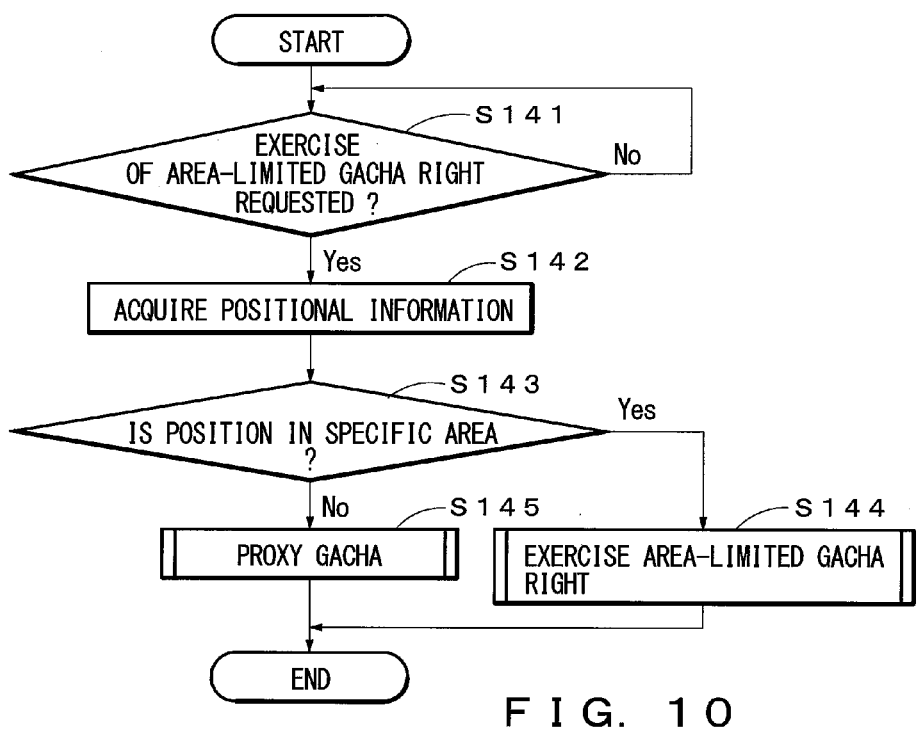
FIG. 10 is a flowchart showing an example process of an area-limited gacha step.

FIG. 10 is a flowchart showing an example process of area-limited gacha step S130.

Area-limited gacha step S130 comprises area-limited gacha right exercise request determining step S141, positional information acquisition step S142, terminal position determining step S143, area-limited gacha right exercising step S144, and proxy gacha step S145.

Area-limited gacha right exercise request determining step S141 is a step in which processing for determining whether exercise of the gacha right has been requested via the terminal 3a of the first physical user is performed. Upon determination that exercise of the gacha right has not been requested (S141: No), step S141 is repeated. When exercise of the gacha right has been requested (S141: Yes), positional information acquisition step S142 and terminal position determining step S143 are performed in sequence.

In positional information acquisition step S142, processing is performed for acquiring the position of the terminal 3a of the first physical user.

In terminal position determining step S143, processing is performed for determining whether the position acquired in positional information acquiring step S142 is in the area in which the area-limited gacha right can be exercised. Upon determination that the position of the terminal 3a is in the aforementioned area (S143: Yes), the process proceeds to area-limited gacha right exercising step S144.

Figure 11:
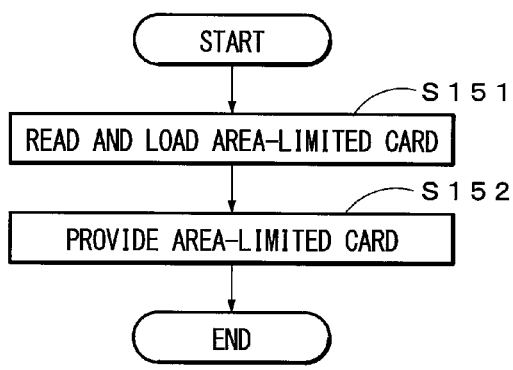
FIG. 11 is a flowchart showing an example process of an area-limited gacha right exercising step.

FIG. 11 is a flowchart showing an example process of area-limited gacha right exercising step S144.

Area-limited gacha right exercising step S144 is a step for performing processing for the first virtual user having acquired the area-limited gacha right to exercise its own gacha right. In area-limited gacha right exercising step S144, area-limited card reading and loading step S151 and area-limited card providing step S152 are performed in sequence. Area-limited card reading and loading step S151 is a step for performing processing for reading and loading an area-limited card from the area-limited card storing section 122A based on the gacha right whose exercise has been requested. In area-limited card providing step S152, the read and loaded area-limited card is provided to the first virtual user having requested exercise of the gacha right.

When area-limited gacha right exercising step S144 is performed, the terminal ID of the terminal through which exercise of the area-limited gacha right is requested and the URI of the area-limited card read and loaded by exercise of the aforesaid gacha right are stored in the card holder storing section 123B in such a manner that the terminal ID and the URI are associated with each other (see FIG. 19B). Based on the information stored in the card holder storing section 123B, the HTML data of a game image containing the URI is transmitted to the terminal 3a of the first physical user identified by the terminal ID.

Figure 22:
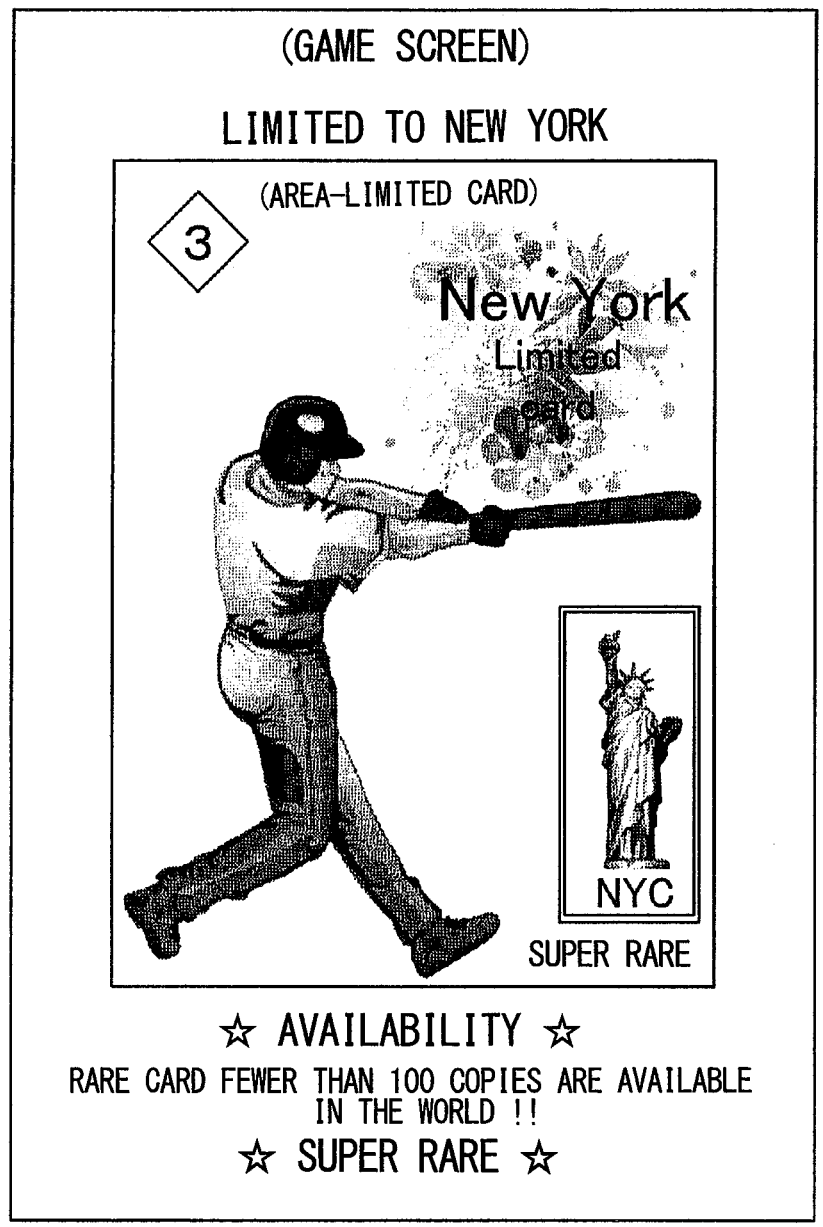
FIG. 22 is a diagram showing an example of an area-limited card display screen.

Upon completion of the foregoing process, the first virtual user having acquired the area-limited gacha right is registered as the holder of the ordinary card based on the area-limited gacha right. At the same time, the game image (see FIG. 22) containing an image of the aforementioned area-limited card can be displayed at the terminal 3a of the first physical user.

When the position of the terminal 3a is not in the aforementioned area (S143: No), the process proceeds to proxy gacha step S145.

FIG. 12 is a flowchart showing an example process of proxy gacha step S145. In proxy gacha step S145, proxy gacha right generating step S161, proxy gacha right granting step S162, and proxy gacha right exercising step S163 are performed in sequence.

FIG. 13 is a flowchart showing an example process of proxy gacha right generating step S161.

In proxy gacha right generating step S161, proxy user displaying and showing step S171, proxy user selecting step S172, and proxy user designating step S173 are performed in sequence.

Proxy user displaying and showing step S171 is a step of performing processing for displaying and showing, to the first virtual user, a virtual user that may exercise the proxy gacha right—in other words, at least one virtual user that can be the second virtual user. In step S171, the proxy user selection screen 41, which contains images 42 of candidates selected from among the virtual users registered by the first virtual user as friends in the social game, is displayed at the terminal 3a of the first physical user (see FIG. 16).

Proxy user selecting step S172 is a step of performing processing for the first virtual user to select one virtual user from among at least one virtual user (second virtual user candidate) displayed and shown in proxy user displaying and showing step S171. In step S172, the first physical user may select a virtual user to be designated as the second virtual user by operating the select button 43 displayed on the proxy user selection screen 41 (see FIG. 16).

Proxy user designating step S173 is a step of performing processing for designating, as the second virtual user, the virtual user selected in proxy user selecting step S172. In step S173, the virtual user selected by the first physical user is designated as the second virtual user. The terminal ID of the terminal 3b, which is used to control the second virtual user, the ID of the proxy gacha right (proxy gacha right ID), and the ID of the gacha right (gacha right ID) that is exercised on a proxy basis by exercise of the proxy gacha right are stored in the proxy gacha right information storing section 123C in such a manner that the three IDs are associated with each other (see FIG. 19C).

In step S171 and S173, the first physical user can select, from among the virtual users that are registered as its friends in the social game, one virtual user deemed to be the most appropriate for having the proxy gacha right granted. By designating the selected virtual user as the second virtual user, the proxy gacha right can be generated for the second virtual user to exercise, as a proxy, the gacha right acquired by the first virtual user.

Proxy gacha right granting step S162 is a step of performing processing for granting the proxy gacha right to the virtual user designated as the second virtual user based on the information stored in the proxy gacha right information storing section 123C. In step S162, the image of the select button 44 (see FIG. 17), which is used for instructing exercise of the proxy gacha right, appears on the game screen displayed at the terminal 3b of the second physical user. Also, processing is performed for enabling acceptance of an instruction via the select button 44.

FIG. 14 is a flowchart showing an example process of proxy gacha right exercising step S163.

Proxy gacha right exercising step S163 is a step of performing processing for the second physical user to operate the terminal 3b to exercise the proxy gacha right. In proxy gacha right exercising step S163, proxy gacha right exercise request determining step S181, positional information acquisition step S182, area determining step S183, and proxy gacha executing step S184 are performed.

Proxy gacha right exercise request determining step S181 is a step wherein processing for determining whether exercise of the proxy gacha right has been requested via the terminal 3b of the second physical user is performed. Upon determination that exercise of the proxy gacha right has not been requested (S181: No), step S181 is repeated. When exercise of the proxy gacha right has been requested (S181: Yes), positional information acquisition step S182 and area determining step S183 are performed in sequence.

In positional information acquisition step S182, processing is performed for acquiring the position of the terminal 3b of the second physical user.

In area determining step S183, processing is performed for determining whether the position acquired in positional information acquisition step S182 is in the area where the area-limited gacha right can be exercised. Upon determination that the position of the terminal 3b is in the area (S183: Yes), the process proceeds to proxy gacha executing step S184. When the position of the terminal 3b is not in the aforementioned area (S183: No), the process returns to positional information acquisition step S182.

FIG. 15 is a flowchart showing an example process of proxy gacha executing step S184.

Proxy gacha executing step S184 comprises area-limited card reading and loading step S191 and area-limited card providing step S192.

Area-limited card reading and loading step S191 is a step for performing processing for reading and loading an area-limited card from the area-limited card storing section 122A based on the area-limited gacha right for which the proxy gacha right has been exercised. Area-limited card providing step S192 is a step of performing processing for providing the read and loaded area-limited card to the first virtual user registered as the holder of the area-limited gacha right for which the proxy gacha right has been exercised.

When proxy gacha executing step S184 is performed, the terminal ID of the terminal through which exercise of the area-limited gacha right is requested and the URI of the area-limited card read and loaded by exercise of the aforesaid area-limited gacha right are stored in the card holder storing section 123B in such a manner that the terminal ID and the URI are associated with each other (see FIG. 19B). Based on the information stored in the card holder storing section 123B, the HTML data of a game image containing the URI is transmitted to the terminal 3a of the first physical user identified by the terminal ID.

Upon completion of the foregoing process, the first virtual user having acquired the area-limited gacha right is registered as the holder of the area-limited card based on the area-limited gacha right. The game image (see FIG. 22) containing an image of the aforementioned area-limited card can be displayed at the terminal 3a of the first physical user.

(4-3) Effect of First Embodiment

In the game server 1 and game system G configured as described above, the proxy gacha right, whereby the area-limited gacha right granted to the first virtual user may be exercised on a proxy basis, is granted to the second virtual user. When the terminal 3b of the second physical user is in a specific area and the proxy gacha right is exercised by the second virtual user, the area-limited gacha right is exercised on a proxy basis. An area-limited card that has been made acquirable by exercise of the area-limited gacha right on a proxy basis is not provided to the second virtual user having exercised the proxy right. Instead, the card is provided to the first virtual user that is the holder of the area-limited gacha right.

It can be difficult for the first physical user to visit a specific area where an area-limited card can be acquired and control the first virtual user via the terminal 3a thereof to exercise the acquisition right for acquiring the area-limited card. Even in the foregoing situation, by have the second virtual user exercise the proxy gacha right, the first physical user may indirectly exercise the area-limited gacha right to acquire the area-limited card.

As described above, instead of the virtual user (first virtual user) having acquired the area-limited gacha right, the area-limited gacha right can be exercised on a proxy basis by another virtual user (second virtual user). This proxy right creates a new relationship between the virtual user (first virtual user) having acquired the area-limited gacha right and the virtual user (second virtual user) that may exercise the aforesaid right as a proxy in a social game. Therefore, this novel relationship stimulates an interest in social games. For example, the present disclosure can be applied to a social game which provides a card of a professional athlete of an area-based team belonging to MLB (Major League Baseball), NFL (National Football League), NBA (National Basketball Association), or the like. By this application of the present disclosure, the card of a professional athlete is provided as an area-limited card in each of the areas where the teams are located. As a result, communications can increase between a user in the abovementioned area and a user who is unable to visit the area, but wishes to acquire the area-limited card.

(5-1) Second Embodiment of Gacha Part 24

Figure 23:
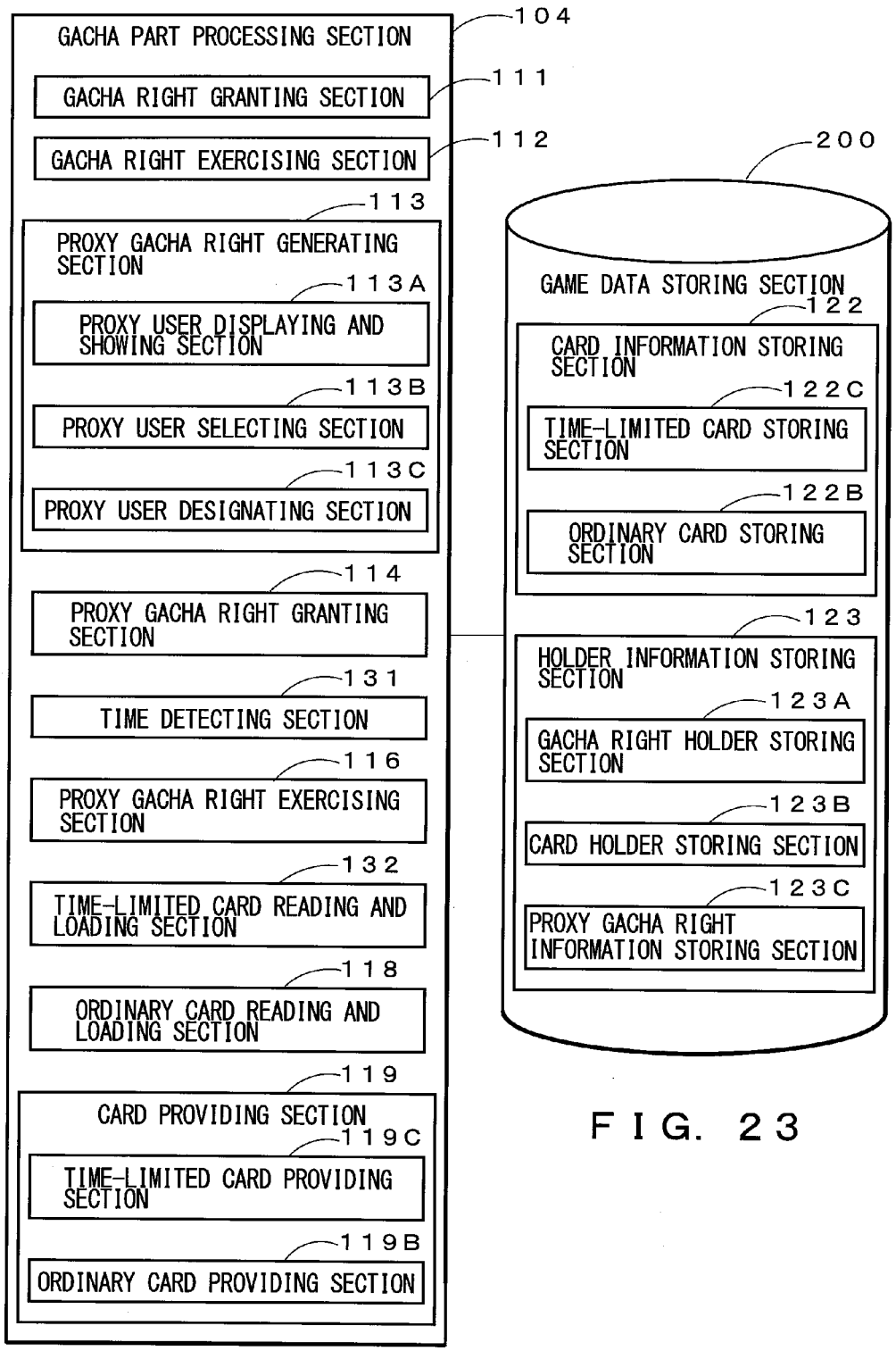
FIG. 23 is a block diagram showing example configurations of a gacha part processing section and a game data storing section.

FIG. 23 shows a second embodiment for embodying the gacha part 24. In this embodiment, examples of granting the time-limited gacha right and the ordinary gacha right to a virtual user will be explained.

(5-1-1) Configuration of Gacha Part Processing Section

FIG. 23 shows constituent elements of the gacha part processing section 104 and the game data storing section 200. In FIG. 23, the positional information acquisition section 115, the area-limited card reading and loading section 117, the card providing section 119A, and the area-limited card storing section 122A of FIG. 5 are replaced, respectively, by a time detecting section 131, a time-limited card reading and loading section 132, a time-limited card providing section 119C, and a time-limited card storing section 122C.

Hereinbelow, the constituent elements of FIG. 23 that are common with those of FIG. 5 will not be explained, and only the functional blocks that are unique to the second embodiment will be explained.

The time detecting section 131 is a functional block that detects the current time. Specifically, the time detecting section 131 is embodied by an electronic time circuit in the arithmetic processing section 13 of the game server 1.

The proxy acquisition right exercising section 116 is a functional block that performs processing for exercising the proxy gacha right by the second virtual user when the time detected by the time detecting section 131 is within a specific time period.

The time-limited card reading and loading section 132 is a functional block that performs processing for reading and loading a time-limited card from the time-limited card storing section 122C based on the gacha right for which the proxy gacha right has been exercised by the second virtual user. In this context, "reading and loading a time-limited card" means, based on the occurrence rate set to each card, randomly extracting the card identification information on one card, which corresponds to the time period of the time detected by the time detecting section 131, from the card identification information on a plurality of cards stored in the time-limited card storing section 122C.

The time-limited card providing section 119C is a functional block that performs processing for providing the first virtual user with a time-limited card read and loaded by the time-limited card reading and loading section 132 based on the gacha right for which the proxy gacha right has been exercised by the proxy acquisition right exercising section 116.

The time-limited card storing section 122C stores image data of a time-limited card.

(5-2) Action of Gacha Part Processing Section

Hereinbelow, the action of the gacha part processing section 104 of the second embodiment will be explained.

Of the flowcharts used in the explanation of the action in the first embodiment, those of FIGS. 6, 8, 9, 12, and 13 will be used again for the explanation below. The flowcharts of FIGS. 24 to 29, which are not referred to above, will be used therefor as well.

(5-2-1) Gacha Part Processing

In the gacha part processing of FIG. 6, gacha right granting step S1 and gacha executing step S2 are performed in sequence.

Gacha right granting step S1 is a step for performing processing for granting the time-limited or ordinary gacha right to the first virtual user. In step S1, the gacha right holder storing section 123A stores the gacha right ID of the time-limited or ordinary gacha right and the terminal ID of the terminal 3a used to control the first virtual user having acquired the aforementioned gacha right in such a manner that the aforementioned IDs are associated with each other (see FIG. 19A). On the game screen displayed at the terminal 3a of the first physical user, processing is performed for displaying images of the select buttons 45 (see FIGS. 20A and 20B) for instructing exercise of the gacha right. Also, processing is performed for enabling acceptance of an instruction via the select button 45.

Gacha executing step S2 is a step for performing processing for providing a card based on the gacha right—i.e., a time-limited or ordinary card—to the first virtual user having acquired the time-limited gacha right or the ordinary gacha right.

(5-2-2) Gacha Execution Processing

FIG. 24 is a flowchart showing an example process of gacha executing step S2.

Gacha executing step S2 comprises gacha right determining step S210, ordinary gacha step S220, and time-limited gacha step S230.

Gacha right determining step S210 is a step of performing processing for determining whether the gacha right granted to the first virtual user is time-limited or ordinary. Upon determination that the gacha right thus granted is ordinary (S210: No), the process proceeds to ordinary gacha step S220. When the granted gacha right is time-limited (S210: Yes), the process proceeds to time-limited gacha step S230.

(5-2-3) Ordinary Gacha Processing

The contents of the process performed in ordinary gacha step S220 are the same as those shown in FIGS. 8 and 9.

(5-2-4) Time-Limited Gacha Processing

Figure 25:
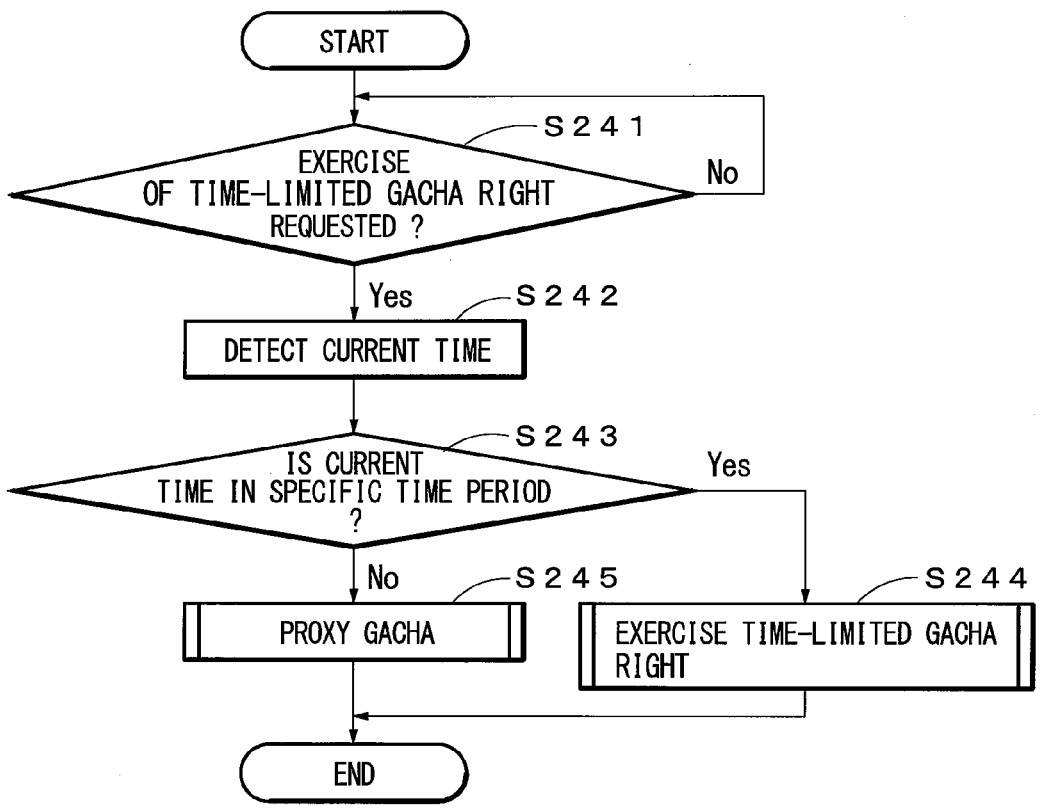
FIG. 25 is a flowchart showing an example process of a time-limited gacha step.

FIG. 25 is a flowchart showing an example process of time-limited gacha step S230.

Time-limited gacha step S230 comprises time-limited gacha right exercise request determining step S241, current time detecting step S242, time period determining step S243, time-limited gacha right exercising step S244, and proxy gacha step S245.

Time-limited gacha right exercise request determining step S241 is a step of performing processing for determining whether the first physical user has requested exercise of the gacha right via the terminal 3*a* thereof. Upon determination that exercise of the gacha right has not been requested (S241: No), step S241 is repeated. When exercise of the gacha right has been requested (S241: Yes), current time detecting step S242 and time period determining step S243 are performed in sequence.

In current time detecting step S242, processing is performed for detecting the time when a request for exercising the gacha right is received.

In time period determining step S243, processing is performed for determining whether the time detected in current time detecting step S242 is within a specific time period. When the detected time is in the specific time period (S243: Yes), the process proceeds to time-limited gacha right exercising step S244.

Figure 26:
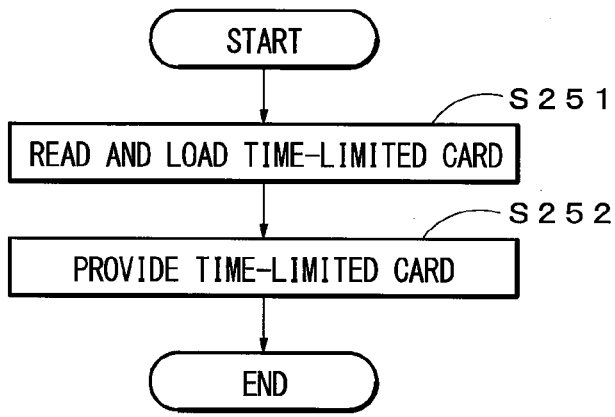
FIG. 26 is a flowchart showing an example process of a time-limited gacha right exercising step.

FIG. 26 is a flowchart showing an example process of time-limited gacha right exercising step S244.

Time-limited gacha right exercising step S244 is a step of performing processing for the first virtual user having acquired the time-limited gacha right to exercise the aforesaid gacha right oneself. In time-limited gacha right exercising step S244, time-limited card reading and loading step S251 and time-limited card providing step S252 are performed in sequence. Time-limited card reading and loading step S251 is a step of performing processing for reading and loading a time-limited card from the time-limited card storing section 122C based on the gacha right whose exercise has been requested. Time-limited card providing step S252 is a step of providing the read and loaded time-limited card to the first virtual user having requested exercise of the gacha right.

When time-limited gacha right exercising step S244 is performed, the terminal ID of the terminal through which exercise of the time-limited gacha right is requested and the URI of the time-limited card read and loaded by exercise of the aforesaid time-limited gacha right are stored in the card holder storing section 123B in such a manner that the terminal ID and the URI are associated with each other (see FIG. 19B). Based on the information stored in the card holder storing section 123B, the HTML data of a game image containing the URI is transmitted to the terminal 3*a* of the first physical user identified by the terminal ID.

Figure 30:
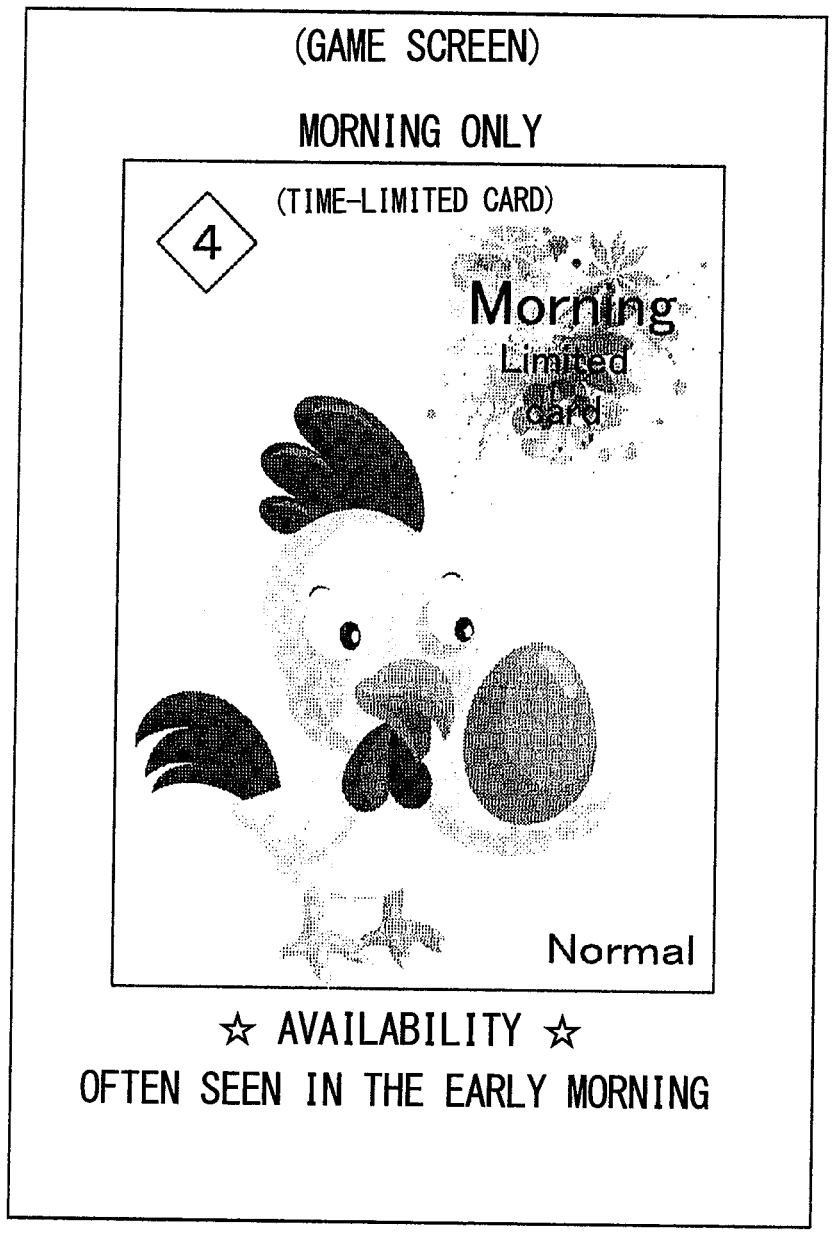
FIG. 30 is a diagram showing an example of a time-limited card display screen.

Upon completion of the foregoing process, the first virtual user having acquired the time-limited gacha right is registered as the holder of the time-limited card based on the time-limited gacha right. The game image (see FIG. 30) containing an image of the aforementioned time-limited card can be displayed at the terminal 3*a* of the first physical user.

When the time detected in current time detecting step S242 is not in the specific time period (S243: No), the process proceeds to proxy gacha step S245.

FIG. 27 is a flowchart showing an example process of proxy gacha step S245.

In proxy gacha step S245, proxy gacha right generating step S261, proxy gacha right granting step S262, and proxy gacha right exercising step S263 are performed in sequence.

The contents of the process performed in proxy gacha right generating step S261 are the same as those shown in FIG. 13. When proxy gacha right generating step S261 is performed, the first physical user may select, from among the virtual users that are registered as its friends in the social game, one virtual user deemed to be the most appropriate for having the proxy gacha right granted. By designating the selected virtual user as the second virtual user, the proxy gacha right can be generated for the second virtual user to exercise, as a proxy, the gacha right acquired by the first virtual user. In proxy gacha right granting step S262, the image of the select button 44 (see FIG. 17), which is used for instructing exercise of the proxy gacha right, appears on the game screen displayed at the terminal 3*b* of the second physical user. Also, processing is performed for enabling acceptance of an instruction via the select button 44.

FIG. 28 is a flowchart showing an example process of proxy gacha right exercising step S263.

In proxy gacha right exercising step S263, proxy gacha right exercise request determining step S281, current time detecting step S282, time period determining step S283, and proxy gacha executing step S284 are performed.

Proxy gacha right exercise request determining step S281 is a step of performing processing for determining whether exercise of the proxy gacha right has been requested via the terminal 3*b* of the second physical user. Upon determination that exercise of the proxy gacha right has not been requested (S281: No), step S281 is repeated. When exercise of the proxy gacha right has been requested (S281: Yes), current time detecting step S282 and time period determining step S283 are performed in sequence.

In current time detecting step S282, processing is performed for detecting the time of receiving a request for exercise of the proxy gacha right.

In time period determining step S283, processing is performed for determining whether the time detected in current time detecting step S282 is within a specific time period. Upon determination that the detected time is in the specific time period (S283: Yes), the process proceeds to proxy gacha executing step S284. When the detected time is not in the specific time period (S283: No), the process returns to current time detecting step S282.

FIG. 29 is a flowchart showing an example process of proxy gacha executing step S284.

Proxy gacha executing step S284 comprises time-limited card reading and loading step S291 and time-limited card providing step S292.

Time-limited card reading and loading step S291 is a step for performing processing for reading and loading a time-limited card from the time-limited card storing section 122C based on the time-limited gacha right for which the proxy gacha right has been exercised. Time-limited card providing step S292 is a step for performing processing for providing the read and loaded time-limited card to the first virtual user registered as the holder of the time-limited gacha right for which the proxy gacha right has been exercised.

When proxy gacha right exercising step S284 is performed, the terminal ID of the terminal through which exercise of the time-limited gacha right has been requested and the URI of the time-limited card read and loaded by exercise of the aforesaid time-limited gacha right are stored in the card holder storing section 123B in such a manner that the terminal ID and the URI are associated with each other (see FIG. 19B). Based on the information stored in the card holder storing section 123B, the HTML data of a game image containing the URI is transmitted to the terminal 3*a* of the first physical user identified by the terminal ID.

Upon completion of the foregoing process, the first virtual user having acquired the time-limited gacha right is registered as the holder of the time-limited card based on the time-limited gacha right. The game image (see FIG. 30) containing an image of the aforementioned time-limited card can be displayed at the terminal 3*a* of the first physical user.

(5-3) Effect of Second Embodiment

In the game server 1 and game system G configured as described above, the proxy gacha right, whereby the time-limited gacha right granted to the first virtual user may be exercised on a proxy basis, is granted to the second virtual user. When the proxy gacha right is exercised by the second virtual user within a specific time period, the time-limited gacha right is exercised on a proxy basis by the second virtual user. A time-limited card that has been made acquirable by exercise of the time-limited gacha right on a proxy basis is not provided to the second virtual user having exercised the proxy right. Instead, the card is provided to the first virtual user that is the holder of the time-limited gacha right.

It can be difficult for the first physical user to control the first virtual user via the terminal 3a thereof to exercise the time-limited gacha right within a specific time period. Even in the foregoing situation, by having the second virtual user exercise the proxy gacha right, the first physical user may indirectly exercise the time-limited gacha right to acquire the time-limited card.

For example, day can be separated into three time periods: morning, afternoon, and evening so as to define that "morning gacha", "afternoon gacha", and "evening gacha" refers to types of gacha that can be executed in the respective time periods, and that the time-limited gacha rights limited to the morning, afternoon, and evening periods can be granted. In such a game system, even when the first virtual user having acquired the time-limited gacha right for the "morning gacha" cannot exercise the right thus acquired, the first virtual user may acquire a morning-limited card by requesting that the second virtual user exercise the proxy gacha right.

As described above, instead of the virtual user (first virtual user) having acquired the time-limited gacha right, the time-limited gacha right can be exercised on a proxy basis by another virtual user (second virtual user). This proxy right creates a new relationship between the virtual user (first virtual user) having acquired the time-limited gacha right and the virtual user (second virtual user) that may exercise the aforesaid right as a proxy in a social game. Therefore, this novel relationship stimulates an interest in social games.

(6-1) Third Embodiment of Gacha Part 24

The game server 1 of a combination of the first and second embodiments is within the technical scope of the present disclosure. Within the framework of the game server 1, when the position of the terminal 3b via which exercise of the proxy gacha right is requested is in a specified area and the request is made within a specified time period, it is possible to exercise the gacha right (hereinafter referred to as the "area-limited and time-limited gacha right") by the second virtual user on a proxy basis.

Figure 31:
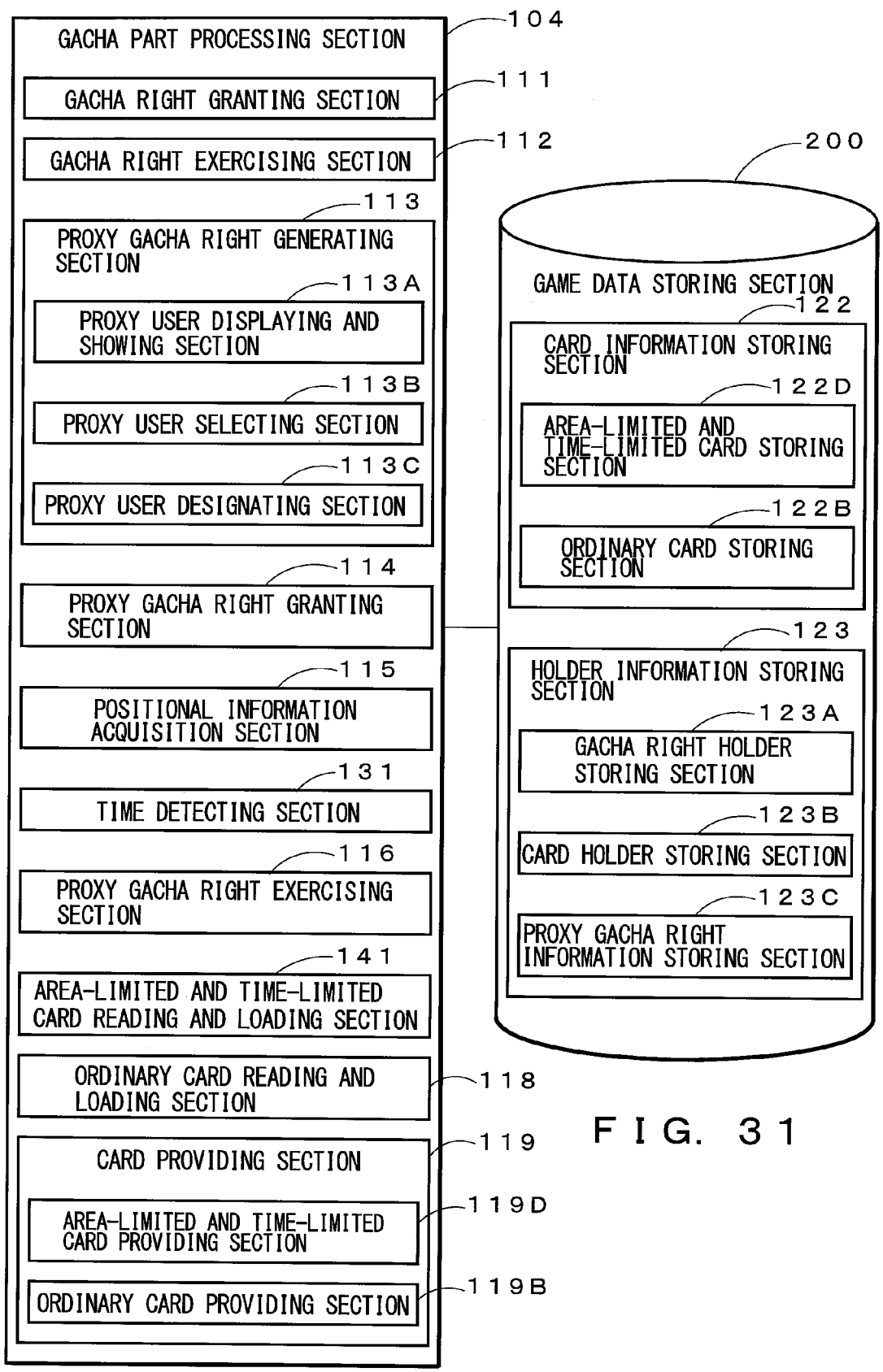
FIG. 31 is a block diagram showing example configurations of a gacha part processing section and a game data storing section.

FIG. 31 shows the third embodiment for embodying the gacha part 24 that can exercise the area-limited and time-limited gacha right as a proxy. In this embodiment, an example of granting the area-limited and time-limited gacha right and the ordinary gacha right to a virtual user will be explained.

(6-1-1) Configuration of Gacha Part Processing Section

FIG. 31 shows constituent elements of the gacha part processing section 104 and the game data storing section 200. The area-limited card reading and loading section 117, the area-limited card providing section 119A, and the area-limited card storing section 122A of FIG. 5 are replaced, respectively, by an area-limited and time-limited card reading and loading section 141, an area-limited and time-limited card providing section 119D, and an area-limited and time-limited card storing section 122D. Also, the time detecting section 131 of FIG. 23 is also comprised as an additional constituent element.

Hereinbelow, the constituent elements of FIG. 31 that are common with those of FIGS. 5 and 23 will not be explained, and only the functional blocks that are unique to the third embodiment will be explained.

The proxy gacha right exercising section 116 is a functional block that performs processing for exercising the proxy gacha right by the second virtual user when the position acquired by the positional information acquisition section 115 is in a specific area of the physical space and the time detected by the time detecting section 131 is within a specific time period.

The area-limited and time-limited card reading and loading section 141 is a functional block that performs processing for reading and loading an area-limited and time-limited card from the area-limited and time-limited card storing section 122D based on the gacha right for which the proxy gacha right has been exercised by the second virtual user. In this context, "reading and loading an area-limited and time-limited card" means, based on the occurrence rate set to each card, randomly extracting the card identification information regarding one card from the card identification information regarding a plurality of cards stored in the area-limited and time-limited card storing section 122D. The extracted information corresponds to the position acquired by the positional information acquisition section 115 and to the time period of the time detected by the time detecting section 131.

The area-limited and time-limited card providing section 119D is a functional block that performs processing for providing the first virtual user with an area-limited and time-limited card read and loaded by the area-limited and time-limited card reading and loading section 141 based on the gacha right for which the proxy gacha right has been exercised by the proxy gacha right exercising section 116.

The area-limited and time-limited card storing section 122D stores image data of an area-limited and time-limited card.

(6-2) Action of Gacha Part Processing Section

Hereinbelow, the action of the gacha part processing section 104 of the third embodiment will be explained.

Of the flowcharts used in explanation of the action in the first embodiment, those of FIGS. 6, 8, 9, 12, and 13 will be used again for the explanation below. The flowcharts of FIGS. 32 to 37, which are not referred to above, will be used therefor as well.

(6-2-1) Gacha Part Processing

In the gacha part processing of FIG. 6, gacha right granting step S1 and gacha executing step S2 are performed in sequence.

Gacha right granting step S1 is a step for performing processing for providing the first virtual user with an area-limited and time-limited gacha right or an ordinary gacha right. In step S1, the gacha right ID of the area-limited and time-limited gacha right or the ordinary gacha right and the terminal ID of the terminal 3a used to control the first virtual user having acquired the gacha right are stored in the gacha right holder storing section 123A in such a manner that the IDs are associated with each other (see FIG. 19A). Also, processing is performed for displaying images of the select buttons 45 (see FIG. 20A and FIG. 20B), which are used for instructing exercise of the gacha right and appear on the game screen displayed at the terminal 3a of the first physical user. Also, processing is performed for enabling acceptance of an instruction via the select button 44.

Gacha executing step S2 is a step wherein processing is performed for providing a card based on the gacha right—in other words, an area-limited and time-limited card or an ordinary card—to the first virtual user having acquired the area-limited and time-limited gacha right or the ordinary gacha right.

(6-2-2) Gacha Execution Processing

FIG. 32 is a flowchart showing an example process of gacha executing step S2.

Gacha executing step S2 comprises gacha right determining step S310, ordinary gacha step S320, and area-limited and time-limited gacha step S330.

Gacha right determining step S310 is a step wherein it is determined whether the gacha right granted to the first virtual user is an area-limited and time-limited gacha right or an ordinary gacha right. Upon determination that the gacha right thus granted is an ordinary gacha right (S310: No), the process proceeds to ordinary gacha step S320. When the right is an area-limited and time-limited gacha right (S310: Yes), the process proceeds to area-limited and time-limited gacha step S330.

(6-2-3) Ordinary Gacha Processing

The contents of the process performed in ordinary gacha step S320 are the same as those shown in FIGS. 8 and 9.

(6-2-4) Area-Limited and Time-Limited Gacha Processing

FIG. 33 is a flowchart showing an example process of area-limited and time-limited gacha step S330.

Area-limited and time-limited gacha step S330 comprises area-limited and time-limited gacha right exercise request determining step S341, positional information acquisition step S342, terminal position determining step S343, current time detecting step S344, time period determining step S345, area-limited and time-limited gacha right exercising step S346, and proxy gacha step S347.

Area-limited and time-limited gacha right exercise request determining step S341 is a step for performing processing for determining whether exercise of the gacha right has been requested via the terminal 3a of the first physical user. Upon determination that exercise of the gacha right has not been requested (S341: No), step S341 is repeated. When exercise of the gacha right has been requested (S341: Yes), positional information acquisition step S342 and area determining step S343 are performed in sequence.

In positional information acquisition step S342, processing is performed for acquiring the position of the terminal 3a of the first physical user.

In terminal position determining step S343, processing is performed for determining whether the position acquired in positional information acquisition step S342 is in an area where the area-limited gacha right can be exercised. Upon determination that the position of the terminal 3a is in the specific area (S343: Yes), current time detecting step S344 and time period determining step S345 are performed in sequence.

In current time detecting step S344, processing is performed for detecting the time of receiving a request for exercise of the gacha right.

In time period determining step S345, processing is performed for determining whether the time detected in current time detecting step S344 is within a specific time period. Upon determination that the detected time is in the specific time period (S345: Yes), the process proceeds to area-limited and time-limited gacha right exercising step S346.

FIG. 34 is a flowchart showing an example process of area-limited and time-limited gacha right exercising step S346.

Area-limited and time-limited gacha right exercising step S346 is a step of performing processing for the first virtual user, which has acquired the area-limited and time-limited gacha right, to exercise the gacha right oneself. In area-limited and time-limited gacha right exercising step S346, area-limited and time-limited card reading and loading step S351 and area-limited and time-limited card providing step S352 are performed in sequence. In area-limited and time-limited card reading and loading step S351, based on the gacha right whose exercise has been requested, processing is performed for reading and loading an area-limited and time-limited card from the area-limited and time-limited card storing section 122D. Area-limited and time-limited card providing step S352 is a step of performing processing for providing the read and loaded area-limited and time-limited card to the first virtual user having requested exercise of the gacha right.

When area-limited and time-limited gacha right exercising step S346 is performed, the terminal ID of the terminal through which exercise of the area-limited and time-limited gacha right is requested and the URI of the area-limited and time-limited card read and loaded by exercise of the aforesaid gacha right are stored in the card holder storing section 123B in such a manner that the terminal ID and the URI are associated with each other (see FIG. 19B). Based on the information stored in the card holder storing section 123B, the HTML data of a game image containing the URI is transmitted to the terminal 3a of the first physical user identified by the terminal ID.

Upon completion of the foregoing process, the first virtual user having acquired the area-limited and time-limited gacha right is registered as the holder of the time-limited card based on the area-limited and time-limited gacha right. The game image (see FIG. 30) containing an image of the aforementioned area-limited and time-limited card can be displayed at the terminal 3a of the first physical user.

When the position of the terminal 3a is not in a specified area (S343: No) or the time detected in current time detecting step S344 is not within a specified time period (S345: No), the process proceeds to proxy gacha step S347.

FIG. 35 is a flowchart showing an example process of proxy gacha step S347.

In proxy gacha step S347, proxy gacha right generating step S361, proxy gacha right granting step S362, and proxy gacha right exercising step S363 are performed in sequence.

The contents of the process performed in proxy gacha right generating step S361 are the same as those shown in FIG. 13. When proxy gacha right generating step S361 is performed, the first physical user may select, from among the virtual users that are registered as friends thereof in the social game, one virtual user deemed to be the most appropriate for having the proxy gacha right granted. By designating the selected virtual user as the second virtual user, the proxy gacha right can be generated for the second virtual user to exercise, as a proxy, the gacha right acquired by the first virtual user. In proxy gacha right granting step S362, the image of the select button 44 (see FIG. 17), which is used for instructing exercise of the proxy gacha right, appears on the game screen displayed at the terminal 3b of the second physical user. Also, processing is performed for enabling acceptance of an instruction via the select button 44.

Figure 36:
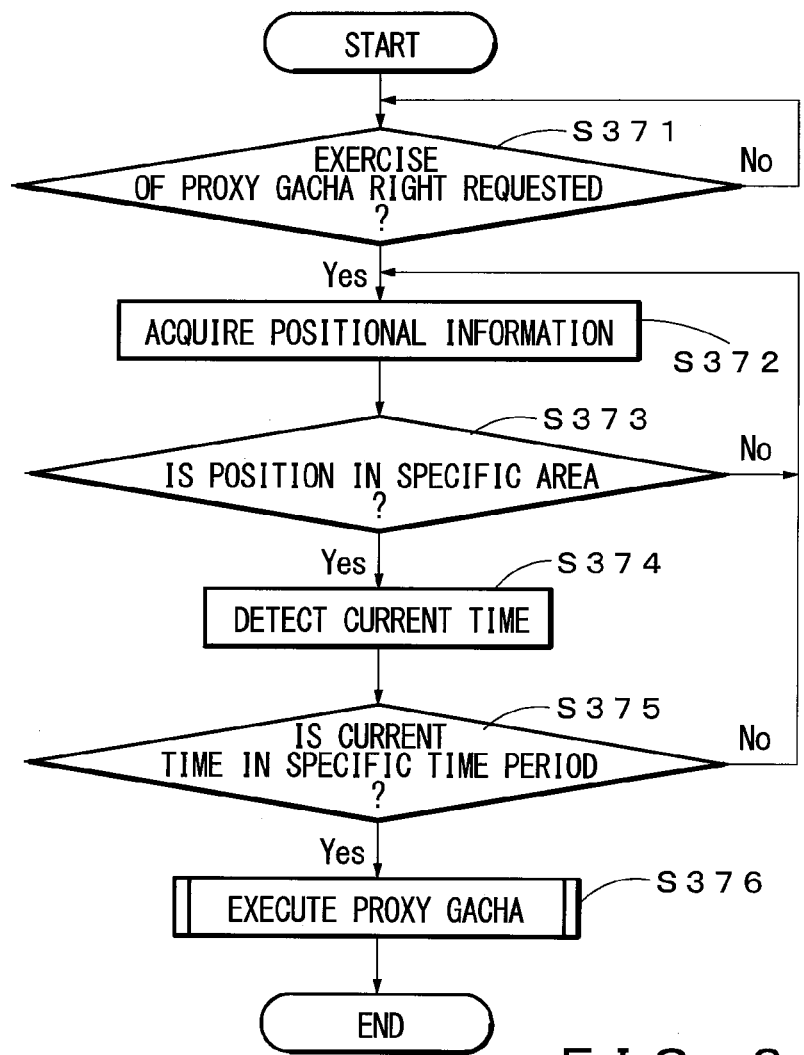
FIG. 36 is a flowchart showing an example process of a proxy gacha right exercising step.

FIG. 36 is a flowchart showing an example process of proxy gacha right exercising step S363.

In proxy gacha right exercising step S363, proxy gacha right exercise request determining step S371, positional information acquisition step S372, area determining step S373, current time detecting step S374, time period determining step S375, and proxy gacha executing step S376 are performed.

Proxy gacha right exercise request determining step S371 is a step for performing processing for determining whether exercise of the proxy gacha right has been requested via the terminal 3b of the second physical user. Upon determination that exercise of the proxy gacha right has not been requested (S371: No), step S371 is repeated. When exercise of the proxy gacha right has been requested (S371: Yes), positional information acquisition step S372 and area determining step S373 are performed in sequence.

In positional information acquisition step S372, processing is performed for acquiring the position of the terminal 3b of the second physical user.

In area determining step S373, processing is performed for determining whether the position acquired in positional information acquisition step S372 is in an area where the area-limited and time-limited gacha right can be exercised. Upon determination that the position of the terminal 3b is in the area (S373: Yes), current time detecting step S374 and time period determining step S375 are performed in sequence. When the position of the terminal 3b is not in the area (S373: No), the process returns to positional information acquisition step S372.

In current time detecting step S374, processing is performed for detecting the time of receiving a request for exercising the proxy gacha right.

In time period determining step S375, processing is performed for determining whether the time detected in current time detecting step S374 is within a specific time period. Upon determination that the detected time is within the specific time period (S375: Yes), the process proceeds to proxy gacha executing step S376. When the detected time is not in the specific time period (S376: No), the process returns to positional information acquisition step S372.

When the detected time is not in the specified time period (S373: No), the process may be returned to positional information acquisition step S372 instead of repeating time period determining step S375. Thereby, when the position is in an area where the area-limited and time-limited gacha right can be exercised and the position thereafter moves to outside the area, exercise of the proxy gacha right can be prevented even if the time is within the specified time period.

Figure 37:
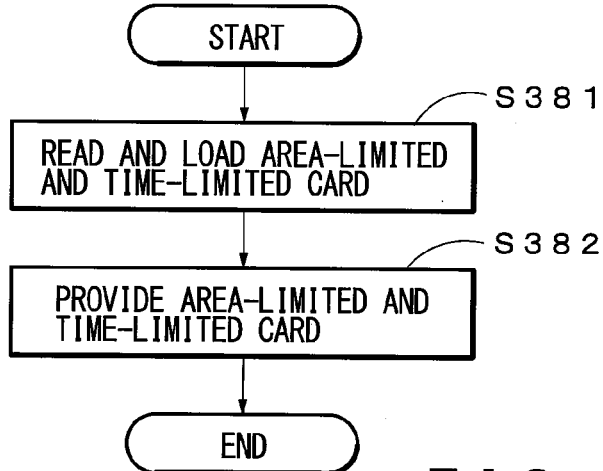
FIG. 37 is a flowchart showing an example process of a proxy gacha executing step.

FIG. 37 is a flowchart showing an example process of proxy gacha executing step S376.

Proxy gacha executing step S376 comprises area-limited and time-limited card reading and loading step S381 and area-limited and time-limited card providing step S382.

Area-limited and time-limited card reading and loading step S381 is a step for performing processing for reading and loading an area-limited and time-limited card from the area-limited and time-limited card storing section 122D based on the area-limited and time-limited gacha right for which the proxy gacha right has been exercised. Area-limited and time-limited card providing step S382 is a step for performing processing for providing the read and loaded area-limited and time-limited card to the first virtual user registered as the holder of the area-limited and time-limited gacha right for which the proxy gacha right has been exercised.

When proxy gacha right exercising step S376 is performed, the terminal ID of the terminal through which exercise of the area-limited and time-limited gacha right is requested and the URI of the area-limited and time-limited card read and loaded by exercise of the aforesaid gacha right are stored in the card holder storing section 123B in such a manner that the terminal ID and the URI are associated with each other (see FIG. 19B). Based on the information stored in the card holder storing section 123B, the HTML data of a game image containing the URI is transmitted to the terminal 3a of the first physical user identified by the terminal ID.

Upon completion of the foregoing process, the first virtual user having acquired the area-limited and time-limited gacha right is registered as the holder of the area-limited and time-limited card based on the area-limited and time-limited gacha right. A game image containing an image of the aforementioned card can be displayed at the terminal 3a of the first physical user.

(6-3) Effect of Third Embodiment

In the game server 1 and game system G configured as described above, the proxy gacha right, whereby the area-limited and time-limited gacha right granted to the first virtual user may be exercised on a proxy basis, is granted to the second virtual user. When the terminal 3b of the second physical user is in a specific area and the proxy gacha right is exercised by the second virtual user within a specific time period, the area-limited and time-limited gacha right is exercised on a proxy basis. An area-limited and time-limited card that has been made acquirable by exercise of the area-limited and time-limited gacha right is not provided to the second virtual user having exercised the proxy right. Instead, the card is provided to the first virtual user that is the holder of the area-limited and time-limited gacha right.

It can be difficult for the first physical user to visit a specific area where an area-limited and time-limited card can be acquired and control the first virtual user via the terminal 3a thereof within a specific time period to exercise the acquisition right for acquiring the area-limited and time-limited card. Even in the foregoing situation, by having the second virtual user exercise the proxy gacha right, the first physical user may indirectly exercise the area-limited and time-limited gacha right to acquire the area-limited and time-limited card.

As described above, instead of the virtual user (first virtual user) having acquired the area-limited and time-limited gacha right, the area-limited and time-limited gacha right can be exercised on a proxy basis by another virtual user (second virtual user). This proxy right creates a new relationship between the virtual user (first virtual user) having acquired the area-limited and time-limited gacha right and the virtual user (second virtual user) that may exercise the aforesaid right on a proxy basis in a social game. Therefore, this novel relationship stimulates an interest in social games. For example, a card featuring an area-specific festival is specified as an area-limited card, and the card is further specified as an area-limited and time-limited card for the period of the festival in the aforesaid area. By applying the present disclosure to the latter social game setting, communications can increase between a user existing in the abovementioned area during the specified time period and a non-local user unable to visit the area during the same period when the non-local wishes to acquire the area-limited and time-limited card.

(7) Other Embodiments

The game server 1 of the first embodiment is configured to allow the second virtual user to exercise the area-limited gacha right as a proxy (S184) when the terminal 3b of the second physical user is in a specific area (S183: Yes) and exercise of the proxy gacha right is requested via the terminal 3b of the second physical user (S181: Yes). However, the game server 1 may be configured to allow the second virtual user to exercise the area-limited gacha right without waiting for a request to exercise the proxy gacha right via the terminal 3b of the second physical user upon recognition that the terminal 3b of the second physical user is in a specific area. Specifically, step S181 may be omitted.

The game server 1 of the second embodiment is configured to allow the second virtual user to exercise the time-limited gacha right as a proxy (S284) when exercise of the proxy gacha right is requested via the terminal 3b of the second physical user (S281: Yes) and the current time is within a specific time period (S283: Yes). However, the game server 1 of the second embodiment may be configured to allow the second virtual user to exercise the time-limited gacha right as a proxy without waiting for a request to exercise the proxy gacha right via the terminal 3*b* of the second physical user when the current time is within a specific time period. Specifically, step S281 may be omitted.

The game server 1 of the third embodiment is configured to allow the second virtual user to exercise the area-limited and time-limited gacha right as a proxy (S376) when the terminal 3*b* of the second physical user is in a specific area (S373: Yes); the current time is within a specific time period (S375: Yes); and exercise of the proxy gacha right is requested via the terminal 3*b* of the second physical user (S371: Yes). However, the game server 1 may be configured to allow the second virtual user to exercise the area-limited and time-limited gacha right as a proxy without waiting for a request to exercise the proxy gacha right via the terminal 3*b* of the second physical user when the terminal 3*b* of the second physical user is in a specific area and the current time is within a specific time period. Specifically, step S281 may be omitted.

Also, the game server 1 of the third embodiment may be configured to allow the second virtual user to exercise the area-limited and time-limited gacha right as a proxy upon determination that exercise of the proxy gacha right is requested via the terminal 3*b* of the second physical user within a specific time period and that thereafter the terminal 3*b* of the second physical user is in a specific area.

What is claimed is:

1. A game server comprising:
   a processor; and
   a memory in communication with the processor, the memory having stored thereon instructions that upon execution by the processor:
   grant an acquisition right for acquiring an item in a virtual space, wherein the acquisition right is granted to a first virtual user in the virtual space that is controllable via a terminal of a first physical user connected to an Internet;
   in response to a request via the terminal of the first physical user, generate a proxy right for a second virtual user in the virtual space to exercise the acquisition right as a proxy, wherein the second virtual user is controllable via a terminal of a second physical user connected to the Internet;
   grant only the proxy right, which has been generated, to the second virtual user, while the acquisition right is reserved by the first virtual user;
   acquire a position of the terminal of the second physical user;
   exercise the proxy right by the second virtual user upon recognition that the position acquired is in a specific area of a physical space;
   store an area-limited item in association with a position in the physical space, wherein the area-limited item is made acquirable by exercising the acquisition right;
   read and load the stored area-limited item which corresponds to the position acquired; and
   based on the acquisition right for which the proxy right has been exercised, provide only the first virtual user with the area-limited item read and loaded.

2. The game server according to claim 1, wherein the instructions that upon execution by the processor further comprises instructions that generate the proxy right when the position of the terminal of the first physical user, through which exercise of the acquisition right on a proxy basis has been requested, is not in the specific area of the physical space.

3. The game server according to claim 1, wherein:
   the instructions that upon execution by the processor generate a proxy right comprise instructions that upon execution by the processor:
   display and show at least one virtual user to the first virtual user, wherein the at least one virtual user may be the second virtual user;
   allow the first virtual user to select one virtual user from among the at least one virtual user displayed and shown; and
   designate, as the second virtual user, the one virtual user.

4. A game controlling method performed by a computer connected to an Internet, the method comprising:
   an acquisition right granting step of granting, by the computer, an acquisition right for acquiring an item in a virtual space, wherein the acquisition right is granted to a first virtual user in the virtual space that is controllable via a terminal of a first physical user connected to the Internet;
   a proxy right generating step of, in response to a request via the terminal of the first physical user, generating, by the computer, a proxy right for a second virtual user in the virtual space to exercise the acquisition right as a proxy, wherein the second virtual user is controllable via a terminal of a second physical user connected to the Internet;
   a proxy right granting step of granting, by the computer, only the proxy right to the second virtual user, while the acquisition right is reserved by the first virtual user;
   a positional information acquisition step of acquiring, by the computer, a position of the terminal of the second physical user;
   a proxy right exercising step of exercising, by the computer, the acquisition right on a proxy basis by the second virtual user based on the proxy right upon recognition that the position of the terminal of the second physical user is in a specific area of a physical space;
   an item information reading and loading step of reading and loading, by the computer, an area-limited item from an area-limited item storage, wherein the area-limited item storage stores the area-limited item, which has been made acquirable by exercise of the acquisition right, in association with a position in the physical space wherein the area-limited item corresponds to the position of the terminal of the second physical user; and
   an item providing step of, based on the acquisition right for which the proxy right has been exercised, providing, by the computer, only the first virtual user with the read and loaded area-limited item.

5. A game system comprising a game server with a plurality of terminals, the game server and the plurality of terminals connected via an Internet,
   the game server comprising:
   a processor; and
   a memory in communication with the processor, the memory having stored thereon instructions that upon execution by the processor:
   grant an acquisition right for acquiring an item in a virtual space, wherein the acquisition right is granted to a first virtual user in the virtual space that is controllable via a terminal of a first physical user connected to the Internet;
   in response to a request via the terminal of the first physical user, generate a proxy right for a second virtual user in the virtual space to exercise the acquisition right as a proxy, wherein the second virtual user is controllable via a terminal of a second physical user connected to the Internet;

grant only the proxy right, to the second virtual user, while the acquisition right is reserved by the first virtual user;

acquire a position of the terminal of the second physical user;

exercise the proxy right by the second virtual user upon recognition that the position acquired is in a specific area of a physical space;

store an area-limited item in association with a position in the physical space, wherein the area-limited item is made acquirable by exercise of the acquisition right;

read and load the stored area-limited item which corresponds to the position acquired; and based on the acquisition right for which the proxy right has been exercised, provide only the first virtual user with the area-limited item read and loaded; and the terminal comprising:

a display section that displays a screen containing an image received from the game server; and an operation input section configured to receive an operation request for a virtual user that is controllable via the terminal is input through the operation input section.

6. A non-transitory computer-readable medium storing a program executed by a computer connected to an Internet, the program comprising:

an acquisition right granting step of granting an acquisition right for acquiring an item in a virtual space, wherein the acquisition right is granted to a first virtual user in the virtual space that is controllable via a terminal of a first physical user connected to the Internet;

a proxy right generating step of, in response to a request via the terminal of the first physical user, generating a proxy right for a second virtual user in the virtual space to exercise the acquisition right on a proxy basis, wherein the second virtual user is controllable via a terminal of a second physical user connected to the Internet;

a proxy right granting step of granting only the proxy right to the second virtual user, while the acquisition right is reserved by the first virtual user;

a positional information acquisition step of acquiring a position of the terminal of the second physical user;

a proxy right exercising step of exercising the proxy right by the second virtual user based on the proxy right upon recognition that the position of the terminal of the second physical user is in a specific area of a physical space;

an item information reading and loading step of reading and loading an area-limited item from an area-limited item storage, wherein the area-limited item storage stores the area-limited item, which has been made acquired by exercise of the acquisition right, in association with a position in the physical space wherein the area-limited item corresponds to the position of the terminal of the second physical user; and an item providing step of, based on the acquisition right for which the proxy right has been exercised, providing only the first virtual user with the read and loaded area-limited item.

* * * * *